United States Patent
Raghavan et al.

(10) Patent No.: US 11,601,925 B2
(45) Date of Patent: Mar. 7, 2023

(54) QUASI CO-LOCATION RELATIONSHIP REPORTING

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/221,756

(22) Filed: Apr. 2, 2021

(65) Prior Publication Data

US 2021/0329621 A1    Oct. 21, 2021

Related U.S. Application Data

(60) Provisional application No. 63/011,504, filed on Apr. 17, 2020.

(51) Int. Cl.
| | |
|---|---|
| *H04W 72/04* | (2009.01) |
| *H04W 56/00* | (2009.01) |
| *H04W 72/044* | (2023.01) |
| *H04L 5/00* | (2006.01) |

(52) U.S. Cl.
CPC ....... *H04W 72/0413* (2013.01); *H04L 5/0048* (2013.01); *H04W 56/00* (2013.01); *H04W 72/042* (2013.01); *H04W 72/046* (2013.01)

(58) Field of Classification Search
None
See application file for complete search history.

(56) References Cited

U.S. PATENT DOCUMENTS

| | | | | |
|---|---|---|---|---|
| 10,616,896 | B2* | 4/2020 | Kundargi | H04B 17/318 |
| 10,644,777 | B2* | 5/2020 | Baligh | H04B 7/024 |
| 10,790,956 | B2* | 9/2020 | Cheng | H04L 5/0048 |
| 11,374,639 | B2* | 6/2022 | Li | H04B 7/0408 |
| 11,395,283 | B2* | 7/2022 | Lin | H04W 72/042 |
| 2013/0279437 | A1* | 10/2013 | Ng | H04L 27/2655 |
| | | | | 370/329 |
| 2015/0043468 | A1* | 2/2015 | Seo | H04L 5/0078 |
| | | | | 370/329 |

(Continued)

*Primary Examiner* — Andrew C Oh
(74) *Attorney, Agent, or Firm* — Holland & Hart LLP

(57) ABSTRACT

Methods, systems, and devices for wireless communications are described. A user equipment (UE) may transmit a first uplink signal to a base station using a first antenna subarray configuration that is associated with a first quasi co-location (QCL) relationship. The UE may determine to switch from using the first antenna subarray configuration to using a second antenna subarray configuration associated with a second QCL relationship based on power, thermal, architectural, or channel conditions, or a combination thereof. The UE may transmit, to the base station, an indication of the second QCL relationship in response to determining to switch subarray configurations. The UE may transmit a second uplink signal using the second antenna subarray to the base station. In some cases, the first QCL relationship and the second QCL relationship may be a QCL-Type A, QCL-Type B, QCL-Type C, or QCL-Type D.

30 Claims, 15 Drawing Sheets

(56) References Cited

U.S. PATENT DOCUMENTS

| | | | |
|---|---|---|---|
| 2015/0103800 A1* | 4/2015 | Seo | H04W 48/16 370/329 |
| 2015/0249517 A1* | 9/2015 | Seo | H04W 72/042 370/329 |
| 2016/0248561 A1* | 8/2016 | Davydov | H04L 5/0048 |
| 2018/0054797 A1* | 2/2018 | Islam | H04L 5/0035 |
| 2018/0184321 A1* | 6/2018 | Kim | H04W 24/10 |
| 2018/0234912 A1* | 8/2018 | Islam | H04B 7/0695 |
| 2018/0331727 A1* | 11/2018 | John Wilson | H04B 7/0617 |
| 2019/0044677 A1* | 2/2019 | Ly | H04B 7/088 |
| 2019/0045494 A1 | 2/2019 | Ho et al. | |
| 2019/0053320 A1* | 2/2019 | Islam | H04B 7/088 |
| 2019/0053321 A1* | 2/2019 | Islam | H04W 76/28 |
| 2019/0059058 A1* | 2/2019 | Chen | H04W 52/242 |
| 2019/0074891 A1* | 3/2019 | Kwon | H04B 7/0695 |
| 2019/0089499 A1* | 3/2019 | Nam | H04L 5/0048 |
| 2019/0115955 A1* | 4/2019 | John Wilson | H04W 72/042 |
| 2019/0141691 A1* | 5/2019 | Kwon | H04B 7/088 |
| 2019/0173534 A1* | 6/2019 | Kakishima | H04L 5/0048 |
| 2019/0190672 A1* | 6/2019 | Kim | H04L 5/0023 |
| 2019/0199496 A1* | 6/2019 | Qin | H04L 5/0048 |
| 2019/0222289 A1* | 7/2019 | John Wilson | H04L 5/0053 |
| 2019/0239092 A1* | 8/2019 | Zhou | H04W 24/10 |
| 2019/0253211 A1* | 8/2019 | Kakishima | H04L 5/0048 |
| 2019/0254110 A1* | 8/2019 | He | H04L 41/0896 |
| 2019/0260425 A1* | 8/2019 | Ji | H04W 24/02 |
| 2019/0260532 A1* | 8/2019 | Manolakos | H04L 5/0094 |
| 2019/0296956 A1* | 9/2019 | John Wilson | H04L 25/0224 |
| 2019/0313389 A1* | 10/2019 | John Wilson | H04L 1/1861 |
| 2019/0313440 A1* | 10/2019 | John Wilson | H04L 5/0053 |
| 2019/0349915 A1* | 11/2019 | Ahn | H04L 5/0091 |
| 2019/0356364 A1* | 11/2019 | Maamari | H04W 72/042 |
| 2019/0356438 A1* | 11/2019 | Lee | H04B 7/0408 |
| 2019/0364556 A1* | 11/2019 | Davydov | H04B 7/0695 |
| 2019/0379431 A1* | 12/2019 | Park | H04B 7/06 |
| 2020/0007208 A1* | 1/2020 | Zhou | H04W 16/28 |
| 2020/0007292 A1* | 1/2020 | Huang | H04B 7/0695 |
| 2020/0053717 A1* | 2/2020 | Zhou | H04W 72/0413 |
| 2020/0053775 A1* | 2/2020 | Lee | H04W 72/046 |
| 2020/0059346 A1* | 2/2020 | Yoo | H04W 76/27 |
| 2020/0076648 A1* | 3/2020 | Li | H04L 25/0204 |
| 2020/0077428 A1* | 3/2020 | Zhou | H04L 5/0023 |
| 2020/0100277 A1* | 3/2020 | Khoshnevisan | H04W 72/1273 |
| 2020/0106498 A1* | 4/2020 | Zhou | H04B 7/0617 |
| 2020/0112860 A1* | 4/2020 | John Wilson | H04W 72/10 |
| 2020/0112886 A1* | 4/2020 | John Wilson | H04W 36/08 |
| 2020/0112974 A1* | 4/2020 | Sun | H04B 7/0695 |
| 2020/0119875 A1* | 4/2020 | John Wilson | H04B 7/088 |
| 2020/0137741 A1* | 4/2020 | Zhou | H04L 5/0092 |
| 2020/0145159 A1* | 5/2020 | Tsai | H04L 5/0053 |
| 2020/0145172 A1* | 5/2020 | Zhou | H04W 76/36 |
| 2020/0154450 A1* | 5/2020 | Zhou | H04W 48/16 |
| 2020/0163071 A1* | 5/2020 | Gao | H04L 5/0057 |
| 2020/0177416 A1* | 6/2020 | Jiang | H04L 27/2613 |
| 2020/0195334 A1* | 6/2020 | Zhou | H04B 7/0695 |
| 2020/0196277 A1* | 6/2020 | Zhou | H04W 72/0413 |
| 2020/0196351 A1* | 6/2020 | Zhou | H04W 76/27 |
| 2020/0204247 A1* | 6/2020 | Zhou | H04B 7/0628 |
| 2020/0221429 A1* | 7/2020 | Li | H04W 72/042 |
| 2020/0229008 A1* | 7/2020 | Islam | H04L 1/0026 |
| 2020/0229161 A1* | 7/2020 | Raghavan | H04L 5/0091 |
| 2020/0244317 A1* | 7/2020 | Wu | H04B 7/024 |
| 2020/0267734 A1* | 8/2020 | Khoshnevisan | H04W 76/11 |
| 2020/0267748 A1* | 8/2020 | Khoshnevisan | H04W 76/15 |
| 2020/0275408 A1* | 8/2020 | Radulescu | H04L 5/0053 |
| 2020/0280396 A1* | 9/2020 | Gao | H04L 1/1861 |
| 2020/0280397 A1* | 9/2020 | Gao | H04W 76/28 |
| 2020/0287678 A1* | 9/2020 | Li | H04L 5/0048 |
| 2020/0287680 A1* | 9/2020 | Zhou | H04L 5/0048 |
| 2020/0313729 A1* | 10/2020 | Zhou | H04B 7/0617 |
| 2020/0313819 A1* | 10/2020 | Zhou | H04B 7/0617 |
| 2020/0314818 A1* | 10/2020 | Jin | H04W 72/046 |
| 2020/0314829 A1* | 10/2020 | Venugopal | H04W 16/28 |
| 2020/0322893 A1* | 10/2020 | Yao | H04L 5/0051 |
| 2020/0329395 A1* | 10/2020 | Pezeshki | H04B 7/0695 |
| 2020/0351055 A1* | 11/2020 | Manolakos | H04L 5/0023 |
| 2020/0366429 A1* | 11/2020 | Huang | H04W 72/085 |
| 2020/0403682 A1* | 12/2020 | Koskela | H04W 80/02 |
| 2021/0014785 A1* | 1/2021 | Vaze | H04W 56/001 |
| 2021/0050972 A1* | 2/2021 | Zheng | H04L 5/0048 |
| 2021/0058998 A1* | 2/2021 | Yuan | H04W 24/08 |
| 2021/0067978 A1* | 3/2021 | Cheraghi | H04B 17/336 |
| 2021/0126753 A1* | 4/2021 | Mochizuki | H04W 72/1268 |
| 2021/0184733 A1* | 6/2021 | Cao | H04B 7/088 |
| 2021/0195605 A1* | 6/2021 | Nilsson | H04W 72/044 |
| 2021/0242922 A1* | 8/2021 | Koskela | H04W 24/08 |
| 2021/0258940 A1* | 8/2021 | Kim | H04L 5/0051 |
| 2021/0298089 A1* | 9/2021 | Ohara | H04L 5/0035 |
| 2021/0307076 A1* | 9/2021 | Matsumura | H04W 74/0833 |
| 2021/0307077 A1* | 9/2021 | Ohara | H04L 5/0048 |
| 2021/0314128 A1* | 10/2021 | Li | H04L 5/0078 |
| 2021/0320711 A1* | 10/2021 | Lee | H04W 74/0833 |
| 2021/0321462 A1* | 10/2021 | Takahashi | H04W 74/0891 |
| 2021/0345201 A1* | 11/2021 | Cheng | H04W 36/0083 |
| 2021/0352665 A1* | 11/2021 | Kang | H04L 1/08 |
| 2021/0352705 A1* | 11/2021 | Kang | H04W 72/0446 |
| 2021/0378026 A1* | 12/2021 | Ohara | H04W 74/02 |
| 2021/0385847 A1* | 12/2021 | Kang | H04L 5/0023 |
| 2021/0391899 A1* | 12/2021 | Cao | H04B 17/373 |
| 2021/0392514 A1* | 12/2021 | Matsumura | H04B 7/088 |
| 2021/0400649 A1* | 12/2021 | Kang | H04B 7/0695 |
| 2021/0400668 A1* | 12/2021 | Matsumura | H04L 5/003 |
| 2021/0409098 A1* | 12/2021 | Matsumura | H04B 7/0834 |
| 2022/0006580 A1* | 1/2022 | Cui | H04L 27/2666 |
| 2022/0022053 A1* | 1/2022 | Kakishima | H04W 16/28 |
| 2022/0022233 A1* | 1/2022 | Lee | H04L 1/0003 |
| 2022/0069957 A1* | 3/2022 | Lee | H04W 72/042 |
| 2022/0070026 A1* | 3/2022 | Chavva | H04L 27/2695 |
| 2022/0123815 A1* | 4/2022 | Karjalainen | H04B 7/024 |
| 2022/0131583 A1* | 4/2022 | Lee | H04B 7/0695 |
| 2022/0158805 A1* | 5/2022 | Frenne | H04W 72/042 |
| 2022/0174620 A1* | 6/2022 | Cha | H04L 5/0023 |
| 2022/0200675 A1* | 6/2022 | Raghavan | H04B 7/063 |
| 2022/0201768 A1* | 6/2022 | Ohara | H04W 74/0841 |
| 2022/0224379 A1* | 7/2022 | Kakishima | H04W 56/001 |
| 2022/0264348 A1* | 8/2022 | Manolakos | H04L 5/0094 |

* cited by examiner

QUASI CO-LOCATION RELATIONSHIP REPORTING

CROSS REFERENCE

The present Application for patent claims the benefit of U.S. Provisional Patent Application No. 63/011,504 by RAGHAVAN et al., entitled "QUASI CO-LOCATION RELATIONSHIP REPORTING," filed Apr. 17, 2020, assigned to the assignee hereof, and expressly incorporated by reference herein.

FIELD OF TECHNOLOGY

The following relates generally to wireless communications and more specifically to quasi co-location (QCL) relationship reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Wireless multiple-access technologies have been adopted in various telecommunication standards to provide a common protocol that enables different wireless devices to communicate on a municipal, national, regional, and even global level. Example telecommunication standards are LTE and NR. LTE and NR are designed to improve spectral efficiency, lower costs, improve services, make use of new spectrum, and better integrate with other standards, including open standards. LTE and NR may use OFDMA on the downlink, single-carrier frequency division multiple access (SC-FDMA) on the uplink, and multiple-input multiple-output (MIMO) antenna technology.

In some wireless communications systems, devices (e.g., UEs, base stations) may communicate in high frequency (HF) bands such as frequency range 2 (FR2) and frequency range 4 (FR4) including frequencies from 24.25 GHz to 114.25 GHz. Some techniques related to uplink transmissions at these high frequencies may be deficient.

SUMMARY

The described techniques relate to improved methods, systems, devices, and apparatuses that support quasi co-location (QCL) relationship reporting. Generally, the described techniques provide for improved methods for uplink QCL relationship reporting, for example in high frequencies ranges (e.g., including but not limited to frequencies in the range 24.25 GHz to 114.25 GHz, such as frequency range 2 (FR2) covering 24.25 GHz to 52.6 GHz and frequency range 4 (FR4) covering 52.6 GHz to 114.25 GHz). A user equipment (UE) may communicate with a base station or other wireless device at high frequencies (e.g., FR2 and FR4). As transmission frequencies increase, wavelengths of signals may decrease. In some cases, antenna elements of an antenna array may be smaller for devices that operate at high frequencies because antenna element size may be directly related to the operating wavelength (e.g., proportional to the operating wavelength). As such, a high frequency (HF) device may be configured with a larger number of antenna elements than a device that operates at lower frequencies in the same amount of space because the antenna elements are smaller than the antenna elements associated with lower frequencies. A device (e.g., a UE) configured with an antenna array with a large number of antenna elements may be able to select more antenna subarray configurations from the large array of varying sizes and geometries as compared to a device configured with a smaller antenna array. In some cases, a UE may change (e.g., dynamically change or select) antenna subarrays for uplink transmissions to address power requirements, thermal requirements, architectural requirements, or to address changes in channel conditions (e.g., angular speeds, blockage), or a combination thereof. Each configuration of an antenna subarray may be associated with a different beam. Such a change in antenna subarray may be associated with a change in a QCL configuration (e.g., which may identify a QCL relationship, and may also be referred to as a QCL type). In some cases, a change in QCL configuration may indicate the use of a different beam associated with the changed antenna subarray configuration compared to a previous transmission.

The UE may be configured to indicate the change in subarray (e.g., antenna subarray configuration) to a base station. For example, the UE may communicate with (e.g., transmit a first uplink signal to) a base station using a first antenna subarray configuration that is associated with a first QCL relationship. The UE may determine to switch from using the first antenna subarray configuration to using a second antenna subarray configuration associated with a second QCL relationship. The UE may transmit, to the base station, an indication of the second QCL relationship in response to determining to switch subarray configurations, where the indication of the second QCL relationship may indicate a change in the subarray configuration used for uplink transmissions. The UE may transmit a second uplink signal using the second antenna subarray and the base station may receive the uplink signal based on the indication from the UE and decode the received uplink signal based on the second QCL relationship. In some cases, the first QCL relationship and the second QCL relationship may be a QCL-Type A, QCL-Type B, QCL-Type C, or QCL-Type D.

A method for wireless communications at a UE is described. The method may include transmitting a first uplink signal to a base station using a first antenna subarray configuration for a first antenna subarray of the UE, the first antenna subarray configuration associated with a first QCL relationship, determining to switch from using the first antenna subarray configuration to using a second antenna subarray configuration for the first antenna subarray, the second antenna subarray configuration associated with a second QCL relationship, transmitting, to the base station, an indication of the second QCL relationship based on the determining to switch, and transmitting a second uplink signal using a second antenna subarray according to the indicated second antenna subarray configuration.

An apparatus for wireless communications at a UE is described. The apparatus may include a processor, memory coupled with the processor, and instructions stored in the memory. The instructions may be executable by the processor to cause the apparatus to transmit a first uplink signal to a base station using a first antenna subarray configuration for a first antenna subarray of the UE, the first antenna subarray configuration associated with a first QCL relationship, determine to switch from using the first antenna subarray configuration to using a second antenna subarray configuration for the first antenna subarray, the second antenna subarray configuration associated with a second QCL relationship, transmit, to the base station, an indication of the second QCL relationship based on the determining to switch, and transmit a second uplink signal using a second antenna subarray according to the indicated second antenna subarray configuration.

Another apparatus for wireless communications at a UE is described. The apparatus may include means for transmitting a first uplink signal to a base station using a first antenna subarray configuration for a first antenna subarray of the UE, the first antenna subarray configuration associated with a first QCL relationship, means for determining to switch from using the first antenna subarray configuration to using a second antenna subarray configuration for the first antenna subarray, the second antenna subarray configuration associated with a second QCL relationship, means for transmitting, to the base station, an indication of the second QCL relationship based on the determining to switch, and means for transmitting a second uplink signal using a second antenna subarray according to the indicated second antenna subarray configuration.

A non-transitory computer-readable medium storing code for wireless communications at a UE is described. The code may include instructions executable by a processor to transmit a first uplink signal to a base station using a first antenna subarray configuration for a first antenna subarray of the UE, the first antenna subarray configuration associated with a first QCL relationship, determine to switch from using the first antenna subarray configuration to using a second antenna subarray configuration for the first antenna subarray, the second antenna subarray configuration associated with a second QCL relationship, transmit, to the base station, an indication of the second QCL relationship based on the determining to switch, and transmit a second uplink signal using a second antenna subarray according to the indicated second antenna subarray configuration.

In some examples of the method, apparatuses, and non-transitory computer-readable medium described herein, the first antenna subarray includes a first subset of antenna elements of an antenna array, and the second antenna subarray includes a second subset of antenna elements of the antenna array.

In some examples of the method, apparatuses, and non-transitory computer-readable medium described herein, at least a first portion of the first subset of antenna elements may be different than the second subset of antenna elements, and at least a second portion of the second subset of antenna elements may be different than the first subset of antenna elements.

In some examples of the method, apparatuses, and non-transitory computer-readable medium described herein, the first antenna subarray of the antenna array, the second antenna subarray of the antenna array, or both, may be configured for communications in a frequency range including at least from 24.25 GHz to 114.25 GHz.

In some examples of the method, apparatuses, and non-transitory computer-readable medium described herein, the first QCL relationship may be a QCL-Type A, QCL-Type B, QCL-Type C, or QCL-Type D, the second QCL relationship may be a QCL-Type A, QCL-Type B, QCL-Type C, or QCL-Type D, and the first QCL relationship may be different than the second QCL relationship.

In some examples of the method, apparatuses, and non-transitory computer-readable medium described herein, the first QCL relationship and the second QCL relationship may be a same QCL type, the QCL type including one of a QCL-Type A, QCL-Type B, QCL-Type C, or QCL-Type D, and a first set of beams associated with the first QCL relationship may be different than a second set of beams associated with the second QCL relationship.

In some examples of the method, apparatuses, and non-transitory computer-readable medium described herein, transmitting the indication may include operations, features, means, or instructions for transmitting, to indicate the second QCL relationship, a sounding reference signal (SRS) that may be associated with the second QCL relationship, or a demodulation reference signal (DMRS) that may be associated with the second QCL relationship, or both.

In some examples of the method, apparatuses, and non-transitory computer-readable medium described herein, the second uplink signal may be a physical uplink shared channel (PUSCH) transmission.

Some examples of the method, apparatuses, and non-transitory computer-readable medium described herein may further include operations, features, means, or instructions for receiving a first downlink signal from the base station and receiving, from the base station, a second downlink signal based on the second QCL relationship between the first downlink signal and the second downlink signal.

In some examples of the method, apparatuses, and non-transitory computer-readable medium described herein, the first downlink signal may be a synchronization signal block (SSB) and the second downlink signal may be a physical downlink control channel (PDCCH) transmission, the first downlink signal may be a channel state information reference signal and the second downlink signal may be a physical downlink shared channel (PDSCH) transmission, or any combination thereof.

Some examples of the method, apparatuses, and non-transitory computer-readable medium described herein may further include operations, features, means, or instructions for determining to switch from the first antenna subarray configuration to the second antenna subarray configuration may be based on a change in a beamformed or non-beamformed delay spread, or a beam coherence time, or a Doppler spread, or an effective Doppler spread, or a combination thereof.

Some examples of the method, apparatuses, and non-transitory computer-readable medium described herein may further include operations, features, means, or instructions for determining the beamformed delay spread using a first beam having a different beamwidth than a second beam used by the UE to transmit the second uplink signal, where determining to switch from the first antenna subarray configuration to the second antenna subarray configuration may be based on the determined beamformed delay spread.

In some examples of the method, apparatuses, and non-transitory computer-readable medium described herein, the beam coherence time corresponds to a relevancy time for a beam in terms of a received signal strength (RSS) correlation used by the UE to transmit the second uplink signal.

A method for wireless communications at a base station is described. The method may include transmitting to a UE according to a first receive configuration based on a first QCL relationship, receiving, from the UE, an indication of a second QCL relationship, receiving an uplink signal according to a second receive configuration based on the received indication of the second QCL relationship, and decoding the received uplink signal based on the second QCL relationship.

An apparatus for wireless communications at a base station is described. The apparatus may include a processor, memory coupled with the processor, and instructions stored in the memory. The instructions may be executable by the processor to cause the apparatus to transmit to a UE according to a first receive configuration based on a first QCL relationship, receive, from the UE, an indication of a second QCL relationship, receive an uplink signal according to a second receive configuration based on the received indication of the second QCL relationship, and decode the received uplink signal based on the second QCL relationship.

Another apparatus for wireless communications at a base station is described. The apparatus may include means for transmitting to a UE according to a first receive configuration based on a first QCL relationship, means for receiving, from the UE, an indication of a second QCL relationship, means for receiving an uplink signal according to a second receive configuration based on the received indication of the second QCL relationship, and means for decoding the received uplink signal based on the second QCL relationship.

A non-transitory computer-readable medium storing code for wireless communications at a base station is described. The code may include instructions executable by a processor to transmit to a UE according to a first receive configuration based on a first QCL relationship, receive, from the UE, an indication of a second QCL relationship, receive an uplink signal according to a second receive configuration based on the received indication of the second QCL relationship, and decode the received uplink signal based on the second QCL relationship.

In some examples of the method, apparatuses, and non-transitory computer-readable medium described herein, the first QCL relationship may be a QCL-Type A, QCL-Type B, QCL-Type C, or QCL-Type D, the second QCL relationship may be a QCL-Type A, QCL-Type B, QCL-Type C, or QCL-Type D, and the first QCL relationship may be different than the second QCL relationship.

In some examples of the method, apparatuses, and non-transitory computer-readable medium described herein, the first QCL relationship and the second QCL relationship may be a same QCL type, the QCL type including one of a QCL-Type A, QCL-Type B, QCL-Type C, or QCL-Type D, and a first set of beams associated with the first QCL relationship may be different than a second set of beams associated with the second QCL relationship.

In some examples of the method, apparatuses, and non-transitory computer-readable medium described herein, receiving the indication may include operations, features, means, or instructions for receiving an SRS associated with the second QCL relationship, a DMRS associated with the second QCL relationship, or any combination thereof.

In some examples of the method, apparatuses, and non-transitory computer-readable medium described herein, the uplink signal may be a PUSCH transmission.

Some examples of the method, apparatuses, and non-transitory computer-readable medium described herein may further include operations, features, means, or instructions for transmitting, to the UE, a first downlink signal and transmitting, to the UE, a second downlink signal based on the second QCL relationship between the first downlink signal and the second downlink signal.

In some examples of the method, apparatuses, and non-transitory computer-readable medium described herein, the first downlink signal may be an SSB and the second downlink signal may be a PDCCH transmission, the first downlink signal may be a channel state information reference signal and the second downlink signal may be a PDSCH transmission, or any combination thereof.

DETAILED DESCRIPTION

Figure 1:
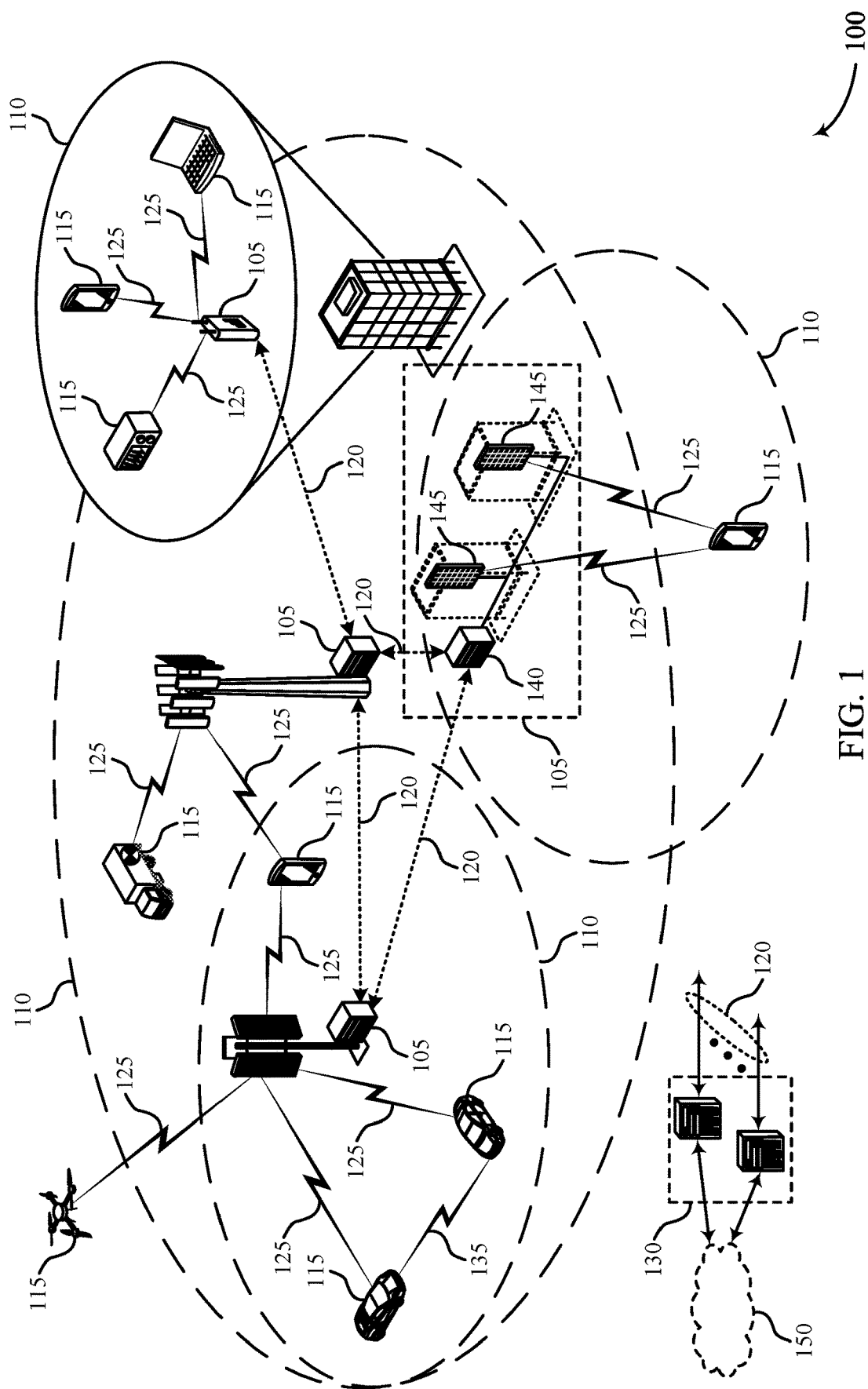
FIG. 1 illustrates an example of a system for wireless communications that supports quasi co-location (QCL) relationship reporting in accordance with aspects of the present disclosure.

In some deployments, wireless communications systems may operate in millimeter wave (mmW) frequency ranges (24 gigahertz (GHz), 26 GHz, 28 GHz, 39 GHz, 24.25-52.6 GHz, 52.6-114.25 GHz, etc.). Wireless communications at these frequencies may be associated with increased signal attenuation (e.g., path loss, penetration loss, blockage loss), which may be influenced by various factors, such as diffraction, propagation environment, density of blockages, material properties, etc. As a result, signal processing techniques, such as beamforming, may be used to coherently combine energy and overcome the path losses at these frequencies. Due to the increased amount of path, penetration and blockage losses in mmW communications systems, transmissions between wireless devices (e.g., from a base station or a user equipment (UE)) may be beamformed.

Moreover, a receiving device may use beamforming techniques to configure antenna(s), antenna element(s), antenna array(s), or antenna array module(s) such that transmissions are received in a directional manner. For example, a wireless device may use an antenna array (e.g., a phased array antenna system) to generate directional beams to transmit or receive transmissions in different or particular directions via a configuration of one or more antenna elements. Manipulating a relationship of, for example, phase or amplitude, for each of the respective antenna elements, may generate a directional communication beam as a composite of the element signals. The antenna elements of such an antenna array may be arranged in various configurations to facilitate forming such a directional beam. According to the techniques described herein, the antenna elements may be configured in any configuration that may facilitate beamformed communications.

In some cases, a device, such as a UE, may operate according to a particular configuration for one or more of its sets of antenna elements. For example, the UE may use a subset of a set of antenna elements (e.g., of one or more antenna arrays or subarrays) of the UE to communicate with another device (e.g., a base station or other communications device). In some cases, transmissions sharing the same antenna port may experience the same channel. In some cases, transmissions from different antenna ports may experience radio channels that share common characteristics. In some cases, a quasi co-location (QCL) relationship between one or more signals may refer to a relationship between the antenna ports, and the corresponding signaling beams of the respective transmissions.

Two antenna ports may be considered QCLed if the large-scale properties of the channel over which a symbol on one antenna port is conveyed can be inferred from the channel over which a symbol on the other antenna port is conveyed. In general, the QCL relationship applies to one or more characteristics. For example, according to a particular QCL type (e.g., QCL-Type A, QCL-Type B, QCL-Type C, QCL-Type D) respective sets of antenna elements may share common beam characteristics, such as a beam direction, a beam width, a beam identifier, a spatial stream, and other like spatial parameters. QCL-Type A may indicate that Doppler shift, Doppler spread, average delay, and delay spread may be the same or similar across different transmissions, such that a device may assume that they are the same. QCL-Type B may indicate that Doppler shift, and Doppler spread may be the same or similar across different transmissions. QCL-Type C may indicate that Doppler shift, and average delay may be the same or similar across different transmissions. QCL-Type D may indicate that a spatial reception parameter, such as a beam, may be the same or similar across different transmissions.

In some wireless communications systems, QCL Type-A, QCL Type-B, QCL Type-C, and QCL Type-D may be limited for use in some frequency bands, and may be limited to use for some communications. For example, QCL types A to C may be used for frequency range 1 (FR1) communications (e.g., including the frequency range 410 MHz to 7125 MHz), and QCL types A, C, and D may be used for frequency range 2 (FR2) communications (e.g., including the frequency range 24.25 GHz to 52.6 GHz). Further, QCL Type-D may be used for uplink transmissions, while QCL types A to C may not be used for uplink transmissions. In some cases, QCL types A, B, and C may not be used for uplink transmissions because UEs transmitting uplink transmissions may be configured with small antenna arrays and QCL types A, B, and C may not provide additional benefit over QCL-Type D.

A QCL configuration may indicate QCL information or spatial relation information for the one or more sets of antenna elements of the UE, which may indicate that respective signals (e.g., reference signals, control channel transmissions, shared channel transmissions) may have a QCL relationship (e.g., that antenna ports used for communicating the respective signals may share one or more characteristics, such as one or more spatial characteristics). For example, a physical downlink shared channel (PDSCH) transmission and a downlink reference signal may be QCLed such that the beam properties of one channel may be derived or inferred from the other, where the channel properties of the downlink reference signal may be used to derive the channel properties of the PDSCH. In some cases, QCL relationship may not mean that a beam characteristic (e.g., beam weights) used for the PDSCH transmission are directly obtained from the downlink reference signal measurements, but that the beam characteristic is based on or derived from the downlink reference signal measurement.

In some wireless communications systems, devices, such as base stations and UEs, may communicate in HF bands (e.g., frequencies in frequency range 4 (FR4) that include 52.6-114.25 GHz). At HF ranges, wavelengths are smaller. Because the operating wavelengths for an antenna array may be used to determine the size and spacing of elements of the antenna array (e.g., for an array of elements of a patch antenna), then the shorter the wavelength, the smaller will be the antenna element. As such, a device that communicates in FR4, or some other HF range, may be able to fit more antenna elements into the same space as compared to a device that communicates in lower frequency bands. In some cases, the arrays used at these higher frequency bands may be referred to as large arrays and include a large set of antenna elements. A large set of antenna elements may increase the number of subarray sizes and geometries that may be possible from the large array. For example, a large array may have more than six antenna elements. In other cases, a large array may have eight or more antenna element, for example 8, 16, 24, or 32 antenna elements, which may be arranged in a two-dimensional array. In some cases, a device, such as a UE, may change the size or geometry, or both of a subarray in response to changing channel conditions and QCL relationships that account for changes in delay spread, Doppler spread, etc. may be useful. As such, in some wireless communications (e.g., communications systems that support HF ranges, such as FR2 and FR4), one or more of QCL-types A, B, C, or D may be used for uplink transmissions, or downlink transmissions, or both.

To support such changes in antenna subarray sizes and geometries, a UE may be configured to indicate the change in subarray to a device with which the UE is communicating, such as a base station. In some cases, the indication may include a corresponding QCL relationship mapping. For example, a UE may communicate (e.g., transmit, receive) with a base station using a first antenna subarray configuration associated with a first QCL relationship. The UE may determine to switch from using the first antenna subarray configuration to using a second antenna subarray configuration that is associated with a second QCL relationship. In response to the switch, the UE may transmit an indication of the second QCL relationship to the base station and the UE may transmit an uplink signal using the second subarray.

Particular aspects of the subject matter described herein may be implemented to realize one or more advantages. The described techniques may support improvements in uplink transmissions at high frequencies by increasing flexibility and improving reliability among other advantages. As such, supported techniques may include improved network operations and, in some examples, may promote network efficiencies, among other benefits.

Aspects of the disclosure are initially described in the context of wireless communications systems. Aspects are then described with respect to a process flow. Aspects of the disclosure are further illustrated by and described with reference to apparatus diagrams, system diagrams, and flowcharts that relate to QCL relationship reporting.

FIG. 1 illustrates an example of a wireless communications system 100 that supports QCL relationship reporting in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the HF or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

A UE 115 may be configured to communicate with a base station in HF ranges (e.g., FR2 or FR4, or a combination thereof). The UE 115 may communicate (e.g., transmit, receive) with the base station 105 using a first antenna subarray configuration of a large antenna array (e.g., an array greater than 6 antenna elements) that is associated with a first QCL relationship. The UE 115 may determine to switch from using the first antenna subarray configuration to using a second antenna subarray configuration associated with a second QCL relationship based on power, thermal, architectural, or channel conditions, or a combination thereof. The UE 115 may transmit, to the base station 105, an indication of the second QCL relationship in response to determining to switch subarray configurations. The UE may transmit an uplink signal using the second antenna subarray to the base station 105, and the base station 105 may decode the received uplink signal based on the second QCL relationship. In some cases, the first QCL relationship and the second QCL relationship may be a QCL-Type A, QCL-Type B, QCL-Type C, or QCL-Type D, where the first QCL relationship and the second QCL relationship may be different. In other cases, the first QCL relationship and the second QCL relationship may be the same, but may use different sets of associated beams.

Figure 2:
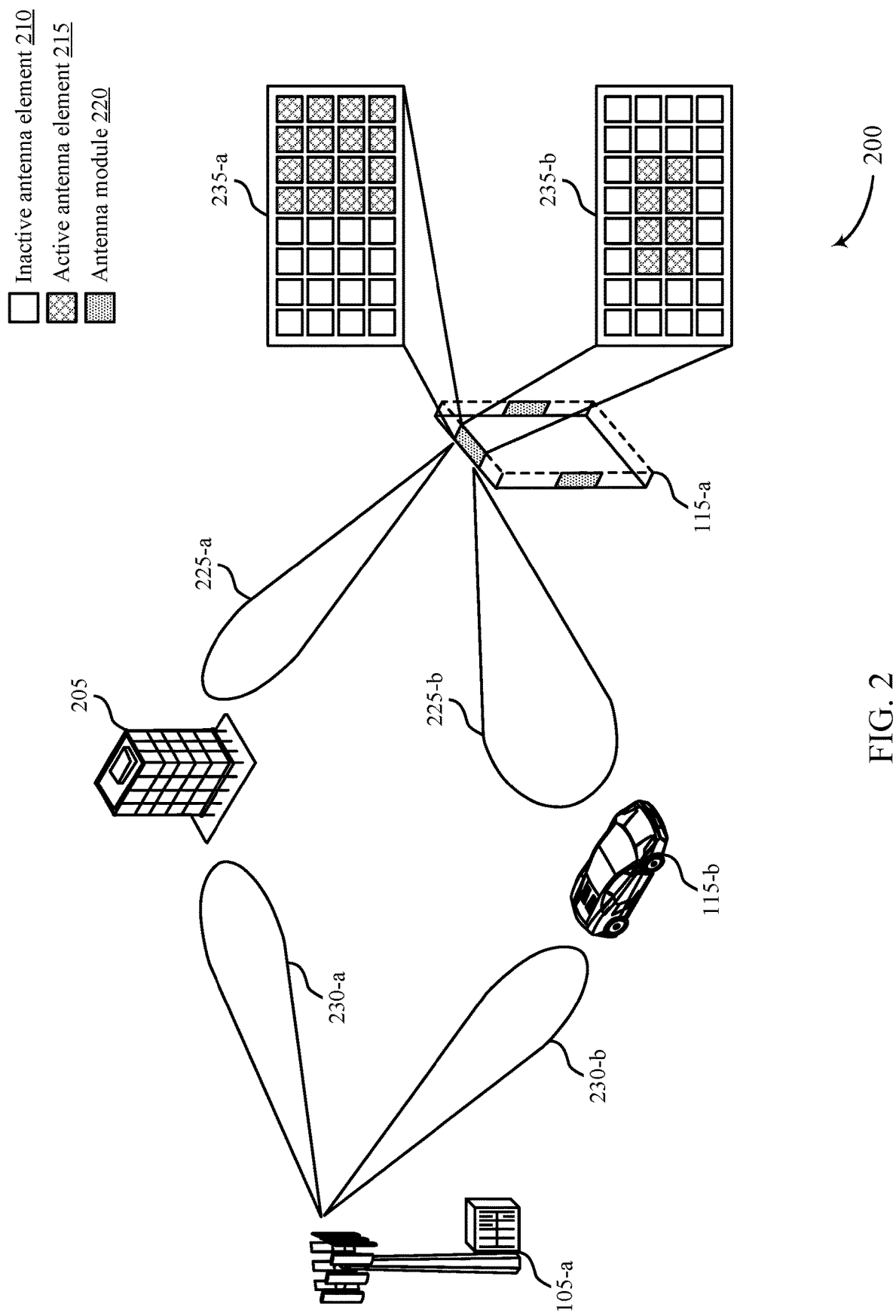
FIG. 2 illustrates an example of a system for wireless communications that supports QCL relationship reporting in accordance with aspects of the present disclosure.

FIG. 2 illustrates an example of a wireless communications system 200 that supports QCL relationship reporting in accordance with aspects of the present disclosure. The wireless communications system 200 may include base station 105-a and UEs 115-a and 115-b, which may be examples of a base station 105 and UEs 115 as described with reference to FIG. 1. Base station 105-a may serve a geographic coverage area that may cover an area surrounding the UEs 115. In some cases, UE 115-a may implement a QCL indication procedure with one or more other UEs 115 or base stations 105. For example, UE 115-a may transmit an indication of a QCL relationship that may indicate an updated antenna subarray. Additionally or alternatively, other wireless devices, such as base station 105, or UE 115-b, or some combination of these devices, may implement QCL relationship indications.

In this example, UE 115-a includes a number of different antenna modules 220. Each of the antenna modules 220 may include an antenna array 235, which may in turn include a number of subarrays of antenna elements, such as inactive antenna elements 210, and active antenna elements 215. The antenna array 235 in this example may include 32 individual antenna elements arranged in an 8×4 antenna configuration. In some cases, the antenna array 235 may be referred to as a large antenna array as the antenna array 235 includes greater than 6 antenna elements. In the illustrative example of FIG. 2, the top antenna module 220 may include an antenna array 235 that may provide an example of different antenna subarrays. Antenna subarray of antenna array 235-a or antenna subarray of antenna array 235-b may include any number of active antenna elements 215, and may be of any geometry. For example, the antenna subarray of antenna array 235-a may include 16 active antenna elements 215 arranged in a 4×4 antenna configuration on the left side of antenna array 235-a and antenna subarray of antenna array 235-b may include 8 active antenna elements 215 arranged in a 4×2 antenna configuration in the middle of antenna array 235-b. In some cases, each of the antenna elements may be a patch antenna configured to communicate in a high-band mmW deployment. In some cases, the spacing of antenna elements within each antenna array 235 may be configured to provide for efficient analog beamforming at wavelengths associated with high-band mmW communications. These configurations for sets of active antenna elements 215 may, in some cases, alternatively be referred to as antenna configurations, antenna element configurations, antenna array configurations, antenna subarray configurations, and other similar terms.

Techniques as discussed herein may be applied to any number or numbers of antenna modules, any number of subarrays included in each antenna module, or any number of antennas per subarray, or any combinations thereof. For example, in a low frequency range deployment, a wireless device may be configured with relatively small antenna arrays (e.g., a 4×1 to 6×1 configuration of antenna elements). Alternatively, a wireless device such as a base station 105 may be configured with relatively large antenna arrays that may use a large amount of power. Such relatively large antenna arrays may be used at a base station, in which case the antenna arrays 235 may have relatively less stringent physical constraints (e.g., power, thermal, etc.). In other deployments (e.g., in FR2, FR4, sub-6 GHz, mmW carrier frequencies), however, a UE 115, such as UE 115-a, may utilize these relatively large antenna arrays 235. The large antenna arrays 235 may be controlled by multiple radio-frequency integrated circuits (RFICs) and may consume a large amount of power and lead to high thermal overheads which may be desirable to be mitigated at the UE 115.

In some implementations, UE 115-a may dynamically switch between subarray configurations over time to address power constraints, thermal constraints, architectural constraints, or changes in channel conditions such as angular spread, blockage, etc. As such, antenna elements may be a degree of freedom chosen dynamically over time by UE 115-a. Due to the large number of possibilities for different configurations of subarrays with the large antenna array 235, a large number of different beams may be configured by the UE 115 based on the active antenna elements 215 selected. For example, subarray of antenna array 235-a may configure beam 225-a and subarray of antenna array 235-b may configure beam 225-b. In some cases, beam 225-a is narrower than beam 225-b because the subarray of antenna array 235-a contains more active antenna elements 215 as compared to the subarray of antenna array 235-b.

In some cases, UE 115-a may operate according to a particular configuration for its antenna arrays and subarrays. According to a particular configuration, UE 115-a may use a given subset of active antenna elements 215 associated with a particular subarray. Additionally, in some cases, a QCL configuration may be associated with each subarray configuration and may indicate QCL information or spatial relationship information (such as different QCL types A, B, C, and D) to a device in communication with UE 115-a, such as base station 105-a or UE 115-b. QCL information may indicate that different signals may have a QCL relationship (e.g., that antenna ports used for transmitting respective signals may share one or more characteristics, such as one or more spatial characteristics). For example, a PDSCH and a physical downlink control channel (PDCCH) that share beam characteristics such that one can be derived from the other may be referred to as having a QCL relationship (which may be referred to as being "QCLed"). That is, the beam characteristics of the PDCCH obtained from knowledge of the beam characteristics of the PDSCH and the QCL relationship (or vice versa).

If a UE 115 is configured with a small antenna array, a QCL relationship may be assigned to the entire array. As such, upon selecting a subarray of the small antenna array, the QCL relationship may remain relatively constant. For example, each subarray that may be selected from a small array may be associated with a relatively similar Doppler shift, Doppler spread, beam coherence, etc. As such, the UE 115 may be configured to use QCL-Type D indicating a spatial parameter of a receiving beam, such as beam weights and beam widths for uplink transmissions using the small antenna array. For example, a small antenna array with an antenna element configuration of 4×1 may be associated with relatively similar Doppler shifts, Doppler spreads, etc. as a subarray with a 1×1 configuration, 2×1 configuration, or 3×1 configuration because they are all subsets of the larger 4×1 configuration. However, the beam widths between the different configurations may vary as an array with a large number of active antenna elements 215 may have a narrow beam width. As such, QCL-Type D may provide a sufficient amount of information between two QCLed antenna ports from a small antenna array because QCL-Type D may account for the change between a narrow beam and a broad beam.

If, however, the UE 115 is configured with a large antenna array 235, where large variations in subarrays are possible (e.g., variations in size, geometry, and position within the large antenna array 235), channel and beam conditions may change, and may not be assumed to remain constant. As such, QCL-Type D may not be sufficient to indicate QCL relationship mapping between two antenna ports within the large antenna array 235. As such, UE 115-a may be configured to use QCL-Type A, QCL-Type B, QCL-Type C, and QCL-Type D for uplink transmissions and downlink transmissions.

Beam formed delay spread may be measured with a narrow beam or a wide beam. Beam coherence time may correspond to the time-scale at which a narrow beam or a wide beam is relevant for uplink transmissions. In some cases, UE 115-a may determine to change subarrays to account for changes in beamformed delay spread, beam coherence time, effective Doppler spread, etc. For example, a 4×4 subarray may result in narrower beam than a 4×2 subarray in the elevation domain represented by the second number in the configuration (e.g., azimuth×elevation). Hence, the beamformed delay spread associated with a 4×4 subarray may be smaller than that associated with a 4×2 subarray. In some implementations, an 8×1 subarray may have a smaller beamformed delay spread in the azimuth dimension than a 4×2 subarray. Similarly, beam coherence time or beam staying time (e.g., the time over which a beam is relevant from a system performance viewpoint) may increase as the degree of beamforming improves, or beam width decreases. In some implementations, beam coherence time is an inverse measure of the Doppler spread. As such, an 8×1 subarray with narrower beam width may have a smaller Doppler spread relative to a 4×2 subarray in the azimuth dimension. In some cases, changes to beam width to account for angular spread of dominant or sub-dominant clusters in the channel may be considered as a QCL relationship change of Types A, B, or C instead of Type D.

In some cases, UE 115-a may perform one or more measurements such as delay spread, Doppler spread, beam coherence, or angular spread of a cluster, or a combination thereof. Based on the one or more measurements, UE 115-a may determine to switch from one subarray to another. For example, UE 115-a may be communicating with base station 105-a over beam 225-a produced from the subarray configuration in antenna array 235-a associated with a first QCL relationship. Beam 225-a may be directed to a building 205 that is in a first cluster. Beam 225-a may reflect off the building 205 and reach base station 105-a. UE 115-a may measure channel conditions (e.g., SNR, signal-to-interference plus noise ratio (SINR), received signal strength (RSS), reference signal received power (RSRP), reference signal received quality (RSRQ), etc.) and determine to switch to subarray of antenna array 235-b based on the current channel conditions to improve signal quality or some other system performance. For example, if signal quality degrades, the UE 115-a may switch to a new configuration to increase a link budget to increase the likelihood that UE 115-a can successfully transmit and receive transmissions. UE 115-a may switch to subarray of antenna array 235-b associated with a second QCL relationship that produces beam 225-a. UE 115-b may indicate the subarray switch to base station 105-a and transmit via beam 225-b directed to UE 115-b of a second cluster. The beam 225-b may reflect off UE 115-b and reach base station 105-a. In some cases, the reflection off UE 115-b in the second cluster may lead to a higher signal quality than the reflection off building 205 in the second cluster.

Additionally or alternatively, UE 115-a may determine to change configurations based on a thermal characteristic of UE 115-a, a power characteristic of UE 115-a, and other like physical characteristics of the UE 115-a that may change over time. For example, UE 115-a may identify that a thermal metric exceeds a corresponding threshold (e.g., a thermal performance threshold), and UE 115-a may determine to change subarrays configurations to achieve an improved thermal performance (or, e.g., battery performance, etc.). Additionally or alternatively, UE 115-a may identify a metric (e.g., pertaining to signal quality, throughput, thermal performance, etc.) of a device with which UE 115-a is communicating, and UE 115-a may change subarray configurations based on the metric of the other device. For example, to improve performance at a nearby node with which UE 115-a is communicating, UE 115-a may determine to change configurations to improve a thermal performance while potentially reducing throughput for communication with the node. Conversely, UE 115-a may determine to change configurations to improve signal quality or throughput while potentially reducing thermal performance of the node.

According to the techniques described herein, the UE 115-a may be communicating with a base station 105 (e.g., base station 105-a), and UE 115-a may determine to change subarray configurations and thus transmitting beams, for example, based on a metric (e.g., a performance metric, a signal quality metric, etc.) satisfying a particular condition (e.g., the metric exceeding a corresponding threshold). UE 115-a may transmit an indication to base station 105-a to indicate that the UE 115-a is changing subarray configurations. For example, UE 115-a may indicate the QCL relationship associated with the new subarray configuration. In some cases, the indication may be included in a sounding reference signal (SRS), where the QCL relationship may indicate that the SRS and a physical uplink shared channel (PUSCH) transmission are associated via the indicated QCL relationship. In some cases, the indications may be included in a physical uplink control channel (PUCCH), such as in a demodulation reference signal (DMRS) of a PUCCH, where the QCL relationship may indicate that the DMRS or PUCCH and a PUSCH transmission are associated via the indicated QCL relationship.

In some implementations, the indication of the QCL relationship may be an explicit indication of the QCL relationship. For example, UE 115-a may directly indicate the current QCL relationship in a reference signal. In some implementations, the UE 115 may implicitly indicate the QCL relationship. The UE 115 may be configured with one or more QCL associations as part of configuring a control channel resource, and the configuration may tie a reference signal resource to the control channel resource based on the association. For example, the base station 105 and the UE 115 may be configured to associate a control channel resource and a reference signal resource based on a QCL Type, such as QCL-Type A, QCL-Type B, QCL-Type C, or QCL-Type D. For example, a first reference signal may be associated with QCL-Type A, a second reference signal may be associated with QCL-Type B, a third reference signal may be associated with QCL-Type C, and a fourth reference signal may be associated with QCL-Type D. Therefore, to indicate the chosen subarray and an associated QCL relationship, the UE 115 may transmit the appropriate reference signal to the base station 105. Based on the received reference signal, the base station 105 may determine the appropriate QCL relationship associated with a further shared channel transmission from the UE 115. The UE 115 may then, in accordance with the appropriate QCL relationship, transmit a shared channel transmission message (e.g., PUSCH) using an antenna port which is QCLed with an antenna port which is used to transmit the reference signal.

Based on the indication from UE 115-a, base station 105-a may adjust one or more parameters, a configuration, or both, for its own antenna array. For example, base station 105-a may increase or decrease a modulation coding scheme (MCS) or transmit power to utilize an increased or decreased available link budget according to the new configuration indicated by UE 115-a. In some cases, base station 105-a may transmit a signal back to UE 115-a indicating its respective adjustment for its antenna arrays, and UE 115-a and base station 105-a may communicate according to the updated configurations. For example, base station 105-a may adjust one or more parameters based on the received indication to receive a PUSCH transmission from UE 115-a. In some implementations, base station 105-a may use the indicated QCL relationship to determine downlink transmissions to UE 115-a. For example, base station 105-a may transmit a synchronization signal block (SSB) to UE 115-a followed by a PDCCH transmission, where the SSB and PDCCH transmission are associated via the indicated QCL relationship. In another example, base station 105-a may transmit a CSI-RS to UE 115-a followed by a PDSCH transmission, where the CSI-RS and the PDSCH transmission are associated via the indicated QCL relationship.

Accordingly, the techniques described herein may provide improved communication reliability and link quality between communications devices.

Figure 3:
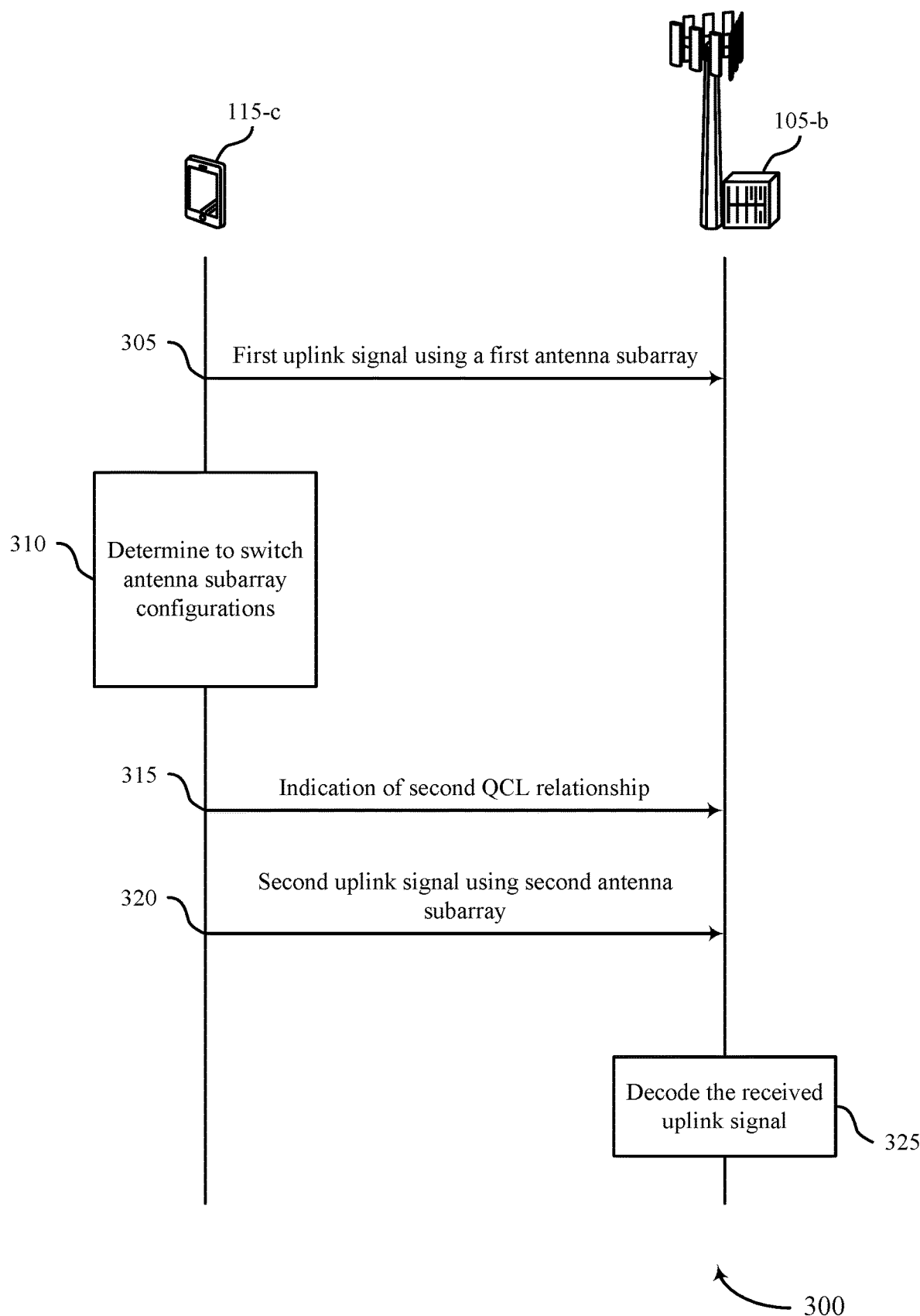
FIG. 3 illustrates an example of a process flow that supports QCL relationship reporting in accordance with aspects of the present disclosure.

FIG. 3 illustrates an example of a process flow 300 that supports QCL relationship reporting in accordance with aspects of the present disclosure. The process flow 300 may illustrate an example subarray switching procedure. For example, UE 115-c may perform a subarray switching procedure to select a subarray to communicate with base station 105-b. Base station 105-b and UE 115-c may be examples of the corresponding wireless devices described with reference to FIGS. 1 and 2. In some cases, instead of UE 115-b implementing the subarray selection procedure, a different type of wireless device (e.g., a base station 105) may perform the subarray selection procedure. Alternative examples of the following may be implemented, where some steps are performed in a different order than described or are not performed at all. In some cases, steps may include additional features not mentioned below, or further steps may be added.

At 305, UE 115-c may transmit a first uplink signal to base station 105-b using a first antenna subarray configuration for a first antenna subarray of UE 115-c. The first antenna subarray configuration may be associated with a first QCL relationship. In some cases, the first antenna subarray includes a first subset of antenna elements of an antenna array. The first QCL relationship may be a QCL-Type A, QCL-Type B, QCL-Type C, or QCL-Type D. In some configurations, the antenna array may refer to a large antenna array that includes greater than 6 antenna elements.

At 310, UE 115-c may determine to switch from using the first antenna subarray configuration to using a second antenna subarray configuration for the first antenna subarray. The second antenna subarray configuration may be associated with a second QCL relationship. In some cases, the second antenna subarray includes a second subset of antenna elements of the antenna array. In some implementations, a first portion of the first subset of antenna elements are different than the second subset of antenna elements, and at least a second portion of the second subset of antenna elements are different than the first subset of antenna elements. The second QCL relationship may be a QCL-Type A, QCL-Type B, QCL-Type C, or QCL-Type D. In some cases, the first QCL relationship and the second QCL relationship are different. In some implementations, the first QCL relationship and the second QCL relationship are a same QCL type, and a first set of beams associated with the first QCL relationship is different than a second set of beams associated with the second QCL relationship. In some cases, the first antenna subarray of the antenna array, and the second antenna subarray of the antenna array, or both may be configured for communications in a frequency range that includes at least from 24.2 GHz to 114.25 GHz (e.g., FR2 and FR4).

In some implementations, UE 115-c may determine to switch from the first antenna subarray configuration to the second antenna subarray configuration is on a change in a beamformed or non-beamformed delay spread, or a beam coherence time, or a Doppler spread, or an effective Doppler spread, or a combination thereof. In some cases, UE 115-c may determine the beamformed delay spread using a first beam having a different beam width than a second beam used by UE 115-c to transmit the second uplink signal, where determining to switch from the first antenna subarray configuration to the second antenna subarray configuration is based on the determined beamformed delay spread. In some cases, the beam coherence time corresponds to a relevancy time for a beam in terms of an RSS correlation used by UE 115-c to transmit the second uplink signal.

At 315, UE 115-c may transmit, to base station 105-b, an indication of the second QCL relationship based on determining to switch subarray configurations. In some cases, UE 115-c may transmit, to indicate the second QCL relationship, an SRS that is associated with the second QCL relationship, or a DMRS that is associated with the second QCL relationship, or both.

At 320, UE 115-c may transmit a second uplink signal using a second antenna subarray according to the indicated second antenna subarray configuration. In some cases, the second uplink signal is a PUSCH transmission.

At 325, base station 105-b may decode the received uplink signal based on the second QCL relationship. In some cases, base station 105-b may then transmit, to UE 115-c, a first downlink signal and transmit a second downlink signal based on the second QCL relationship between the first downlink signal and the second downlink signal. In some cases, the first downlink signal is an SSB and the second downlink signal is a PDCCH transmission, the first downlink signal is a CSI-RS and the second downlink signal is a PDSCH transmission, or any combination thereof.

Figure 4:
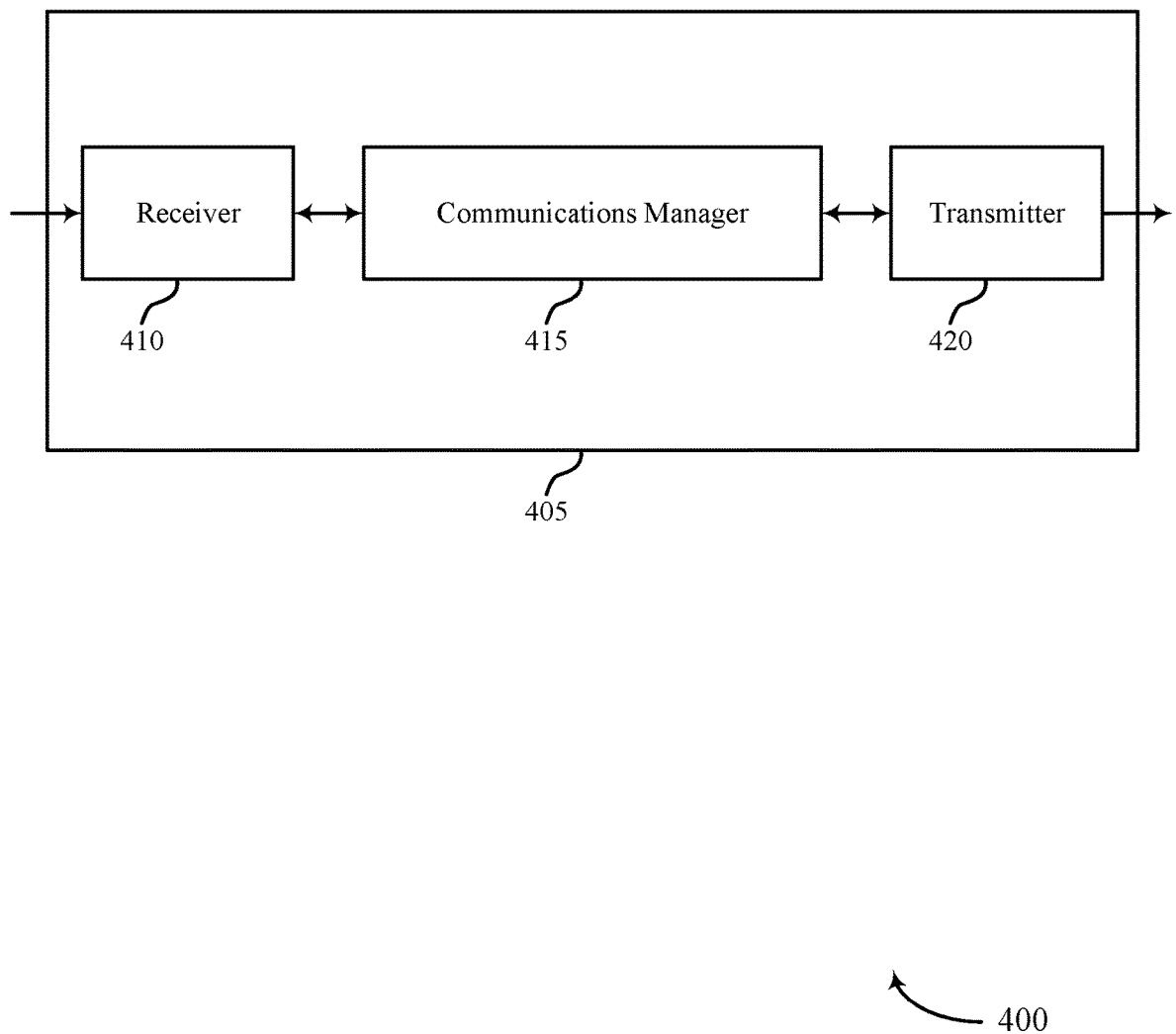
FIGS. 4 and 5 show block diagrams of devices that support QCL relationship reporting in accordance with aspects of the present disclosure.

FIG. 4 shows a block diagram 400 of a device 405 that supports QCL relationship reporting in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to QCL relationship reporting, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may transmit a first uplink signal to a base station using a first antenna subarray configuration for a first antenna subarray of the UE, the first antenna subarray configuration associated with a first QCL relationship, determine to switch from using the first antenna subarray configuration to using a second antenna subarray configuration for the first antenna subarray, the second antenna subarray configuration associated with a second QCL relationship, transmit, to the base station, an indication of the second QCL relationship based on the determining to switch, and transmit a second uplink signal using a second antenna subarray according to the indicated second antenna subarray configuration, and. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

The communications manager 415 as described herein may be implemented to realize one or more potential advantages. One implementation may allow the device 405 to more reliably select a subarray configuration and indicate the configuration to a base station. For example, a device 405 may select a subarray configuration from a large antenna array and indicate a QCL relationship to the base station based on the selected subarray.

Based on implementing the subarray selection and reporting procedure as described herein, a processor of a UE 115 (e.g., controlling the receiver 410, the transmitter 420, or the transceiver 720 as described with reference to FIG. 7) may increase reliability and efficiency in the communication of QCL relationships associated with uplink and downlink transmissions between a UE 115 and a base station.

By including or configuring the communications manager 415 in accordance with examples as described herein, the device 405 (e.g., a processor controlling or otherwise coupled to the receiver 410, the communications manager 415, the transmitter 420, or a combination thereof) may support techniques for reduced processing, reduced power consumption, and more efficient utilization of communication resources.

Figure 5:
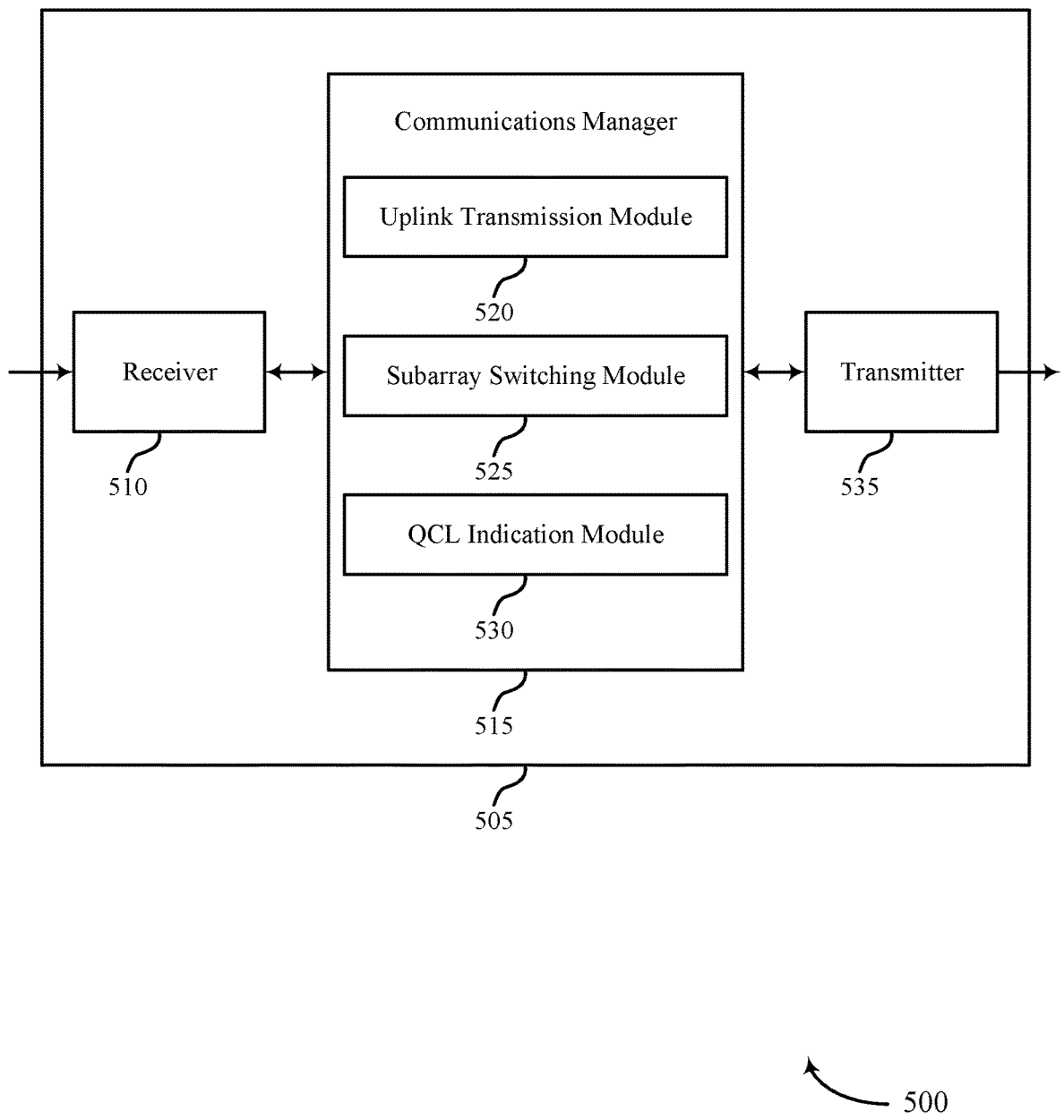

FIG. 5 shows a block diagram 500 of a device 505 that supports QCL relationship reporting in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to QCL relationship reporting, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include an uplink transmission module 520, a subarray switching module 525, and a QCL indication module 530. The communications manager 515 may be an example of aspects of the communications manager 710 described herein.

The uplink transmission module 520 may transmit a first uplink signal to a base station using a first antenna subarray configuration for a first antenna subarray of the UE, the first antenna subarray configuration associated with a first QCL relationship. The subarray switching module 525 may determine to switch from using the first antenna subarray configuration to using a second antenna subarray configuration for the first antenna subarray, the second antenna subarray configuration associated with a second QCL relationship. The QCL indication module 530 may transmit, to the base station, an indication of the second QCL relationship based on the determining to switch. The uplink transmission module 520 may transmit a second uplink signal using a second antenna subarray according to the indicated second antenna subarray configuration.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
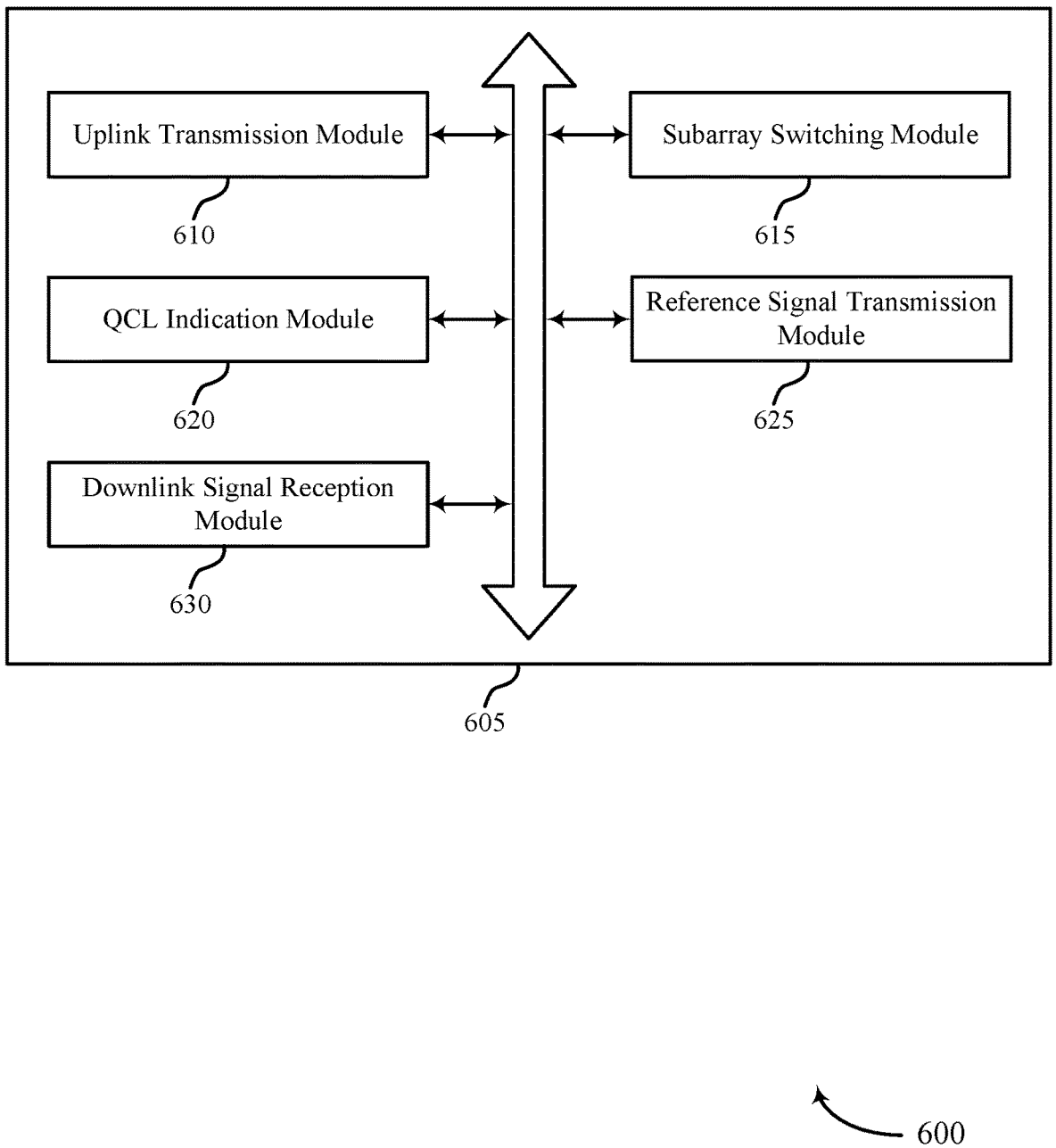
FIG. 6 shows a block diagram of a communications manager that supports QCL relationship reporting in accordance with aspects of the present disclosure.

FIG. 6 shows a block diagram 600 of a communications manager 605 that supports QCL relationship reporting in accordance with aspects of the present disclosure. The communications manager 605 may be an example of aspects of a communications manager 415, a communications manager 515, or a communications manager 710 described herein. The communications manager 605 may include an uplink transmission module 610, a subarray switching module 615, a QCL indication module 620, a reference signal transmission module 625, and a downlink signal reception module 630. Each of these modules may communicate, directly or indirectly, with one another (e.g., via one or more buses).

The uplink transmission module 610 may transmit a first uplink signal to a base station using a first antenna subarray configuration for a first antenna subarray of the UE, the first antenna subarray configuration associated with a first QCL relationship. The subarray switching module 615 may determine to switch from using the first antenna subarray configuration to using a second antenna subarray configuration for the first antenna subarray, the second antenna subarray configuration associated with a second QCL relationship. The QCL indication module 620 may transmit, to the base station, an indication of the second QCL relationship based on the determining to switch. The uplink transmission module 610 may transmit a second uplink signal using a second antenna subarray according to the indicated second antenna subarray configuration.

In some cases, the first antenna subarray includes a first subset of antenna elements of an antenna array, and the second antenna subarray includes a second subset of antenna elements of the antenna array. In some cases, at least a first portion of the first subset of antenna elements are different than the second subset of antenna elements, and at least a second portion of the second subset of antenna elements are different than the first subset of antenna elements. In some cases, the first antenna subarray of the antenna array, the second antenna subarray of the antenna array, or both, are configured for communications in a frequency range including at least from 24.25 GHz to 114.25 GHz.

In some cases, the first QCL relationship is a QCL-Type A, QCL-Type B, QCL-Type C, or QCL-Type D. In some cases, the second QCL relationship is a QCL-Type A, QCL-Type B, QCL-Type C, or QCL-Type D. In some cases, the first QCL relationship is different than the second QCL relationship. In some cases, the first QCL relationship and the second QCL relationship are a same QCL type, the QCL type including one of a QCL-Type A, QCL-Type B, QCL-Type C, or QCL-Type D, and a first set of beams associated with the first QCL relationship is different than a second set of beams associated with the second QCL relationship.

The reference signal transmission module 625 may transmit, to indicate the second QCL relationship, an SRS that is associated with the second QCL relationship, or a DMRS that is associated with the second QCL relationship, or both. The reference signal transmission module 625 may transmit the SRS to indicate the second QCL relationship. In some examples, the reference signal transmission module 625 may transmit the DMRS to indicate the second QCL relationship. In some cases, the second uplink signal is a PUSCH transmission.

The downlink signal reception module 630 may receive a first downlink signal from the base station. In some examples, the downlink signal reception module 630 may receive, from the base station, a second downlink signal based on the second QCL relationship between the first downlink signal and the second downlink signal. In some cases, the first downlink signal is an SSB and the second downlink signal is a PDCCH transmission, the first downlink signal is a channel state information reference signal and the second downlink signal is a PDSCH transmission, or any combination thereof.

In some examples, the subarray switching module 615 may determine to switch from the first antenna subarray configuration to the second antenna subarray configuration is based on a change in a beamformed or non-beamformed delay spread, or a beam coherence time, or a Doppler spread, or an effective Doppler spread, or a combination thereof. In some examples, the subarray switching module 615 may determine the beamformed delay spread using a first beam having a different beamwidth than a second beam used by the UE to transmit the second uplink signal, where determining to switch from the first antenna subarray configuration to the second antenna subarray configuration is based on the determined beamformed delay spread. In some cases, the beam coherence time corresponds to a relevancy time for a beam in terms of an RSS correlation used by the UE to transmit the second uplink signal.

Figure 7:
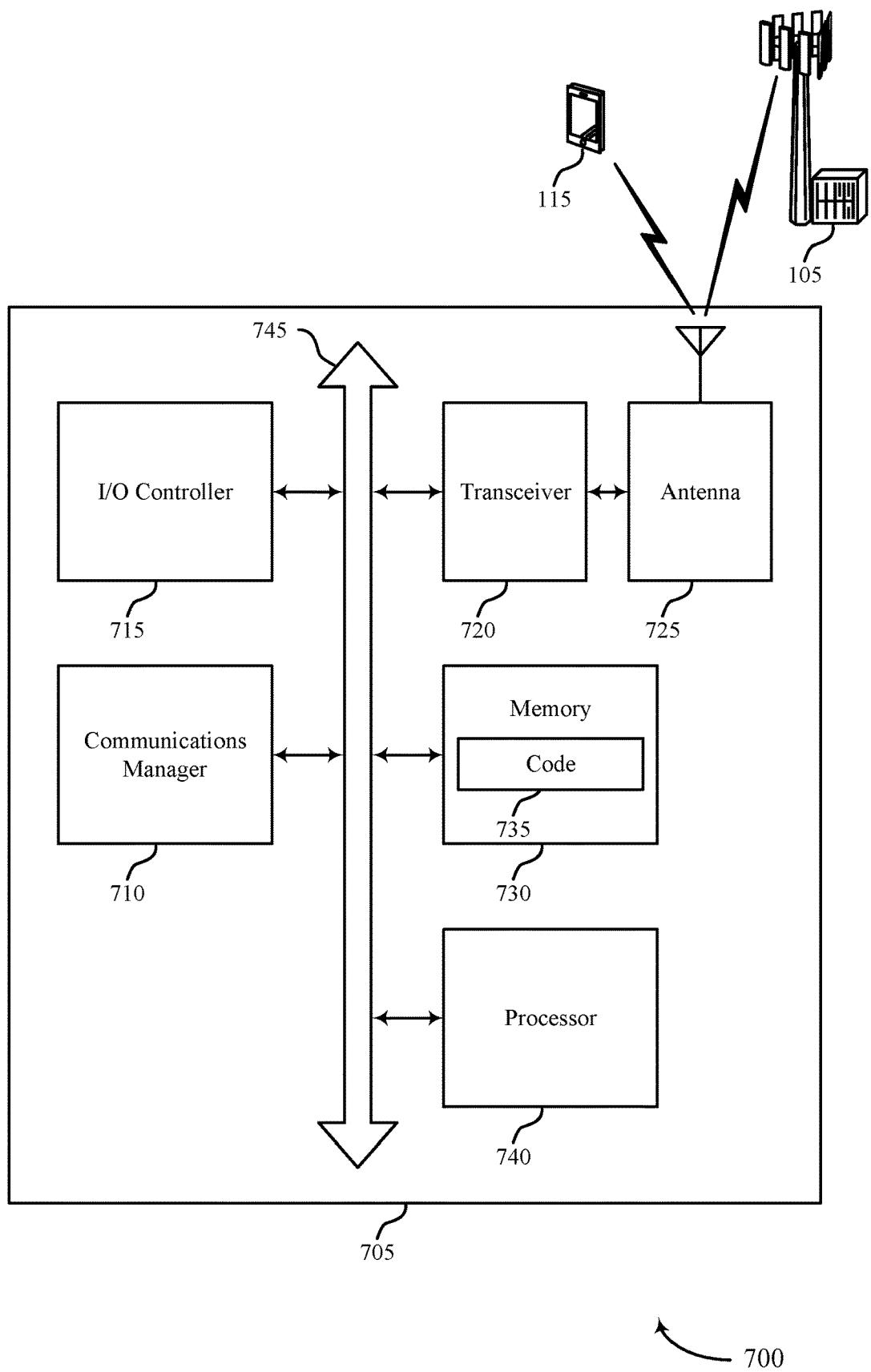
FIG. 7 shows a diagram of a system including a device that supports QCL relationship reporting in accordance with aspects of the present disclosure.

FIG. 7 shows a diagram of a system 700 including a device 705 that supports QCL relationship reporting in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may transmit a first uplink signal to a base station using a first antenna subarray configuration for a first antenna subarray of the UE, the first antenna subarray configuration associated with a first QCL relationship, determine to switch from using the first antenna subarray configuration to using a second antenna subarray configuration for the first antenna subarray, the second antenna subarray configuration associated with a second QCL relationship, transmit, to the base station, an indication of the second QCL relationship based on the determining to switch, and transmit a second uplink signal using a second antenna subarray according to the indicated second antenna subarray configuration.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting QCL relationship reporting).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

By including or configuring the communications manager 710 in accordance with examples as described herein, the device 705 may support techniques for improved communication reliability, reduced latency, improved user experience related to reduced processing, reduced power consumption, more efficient utilization of communication resources, improved coordination between devices, longer battery life, and improved utilization of processing capability.

Figure 8:
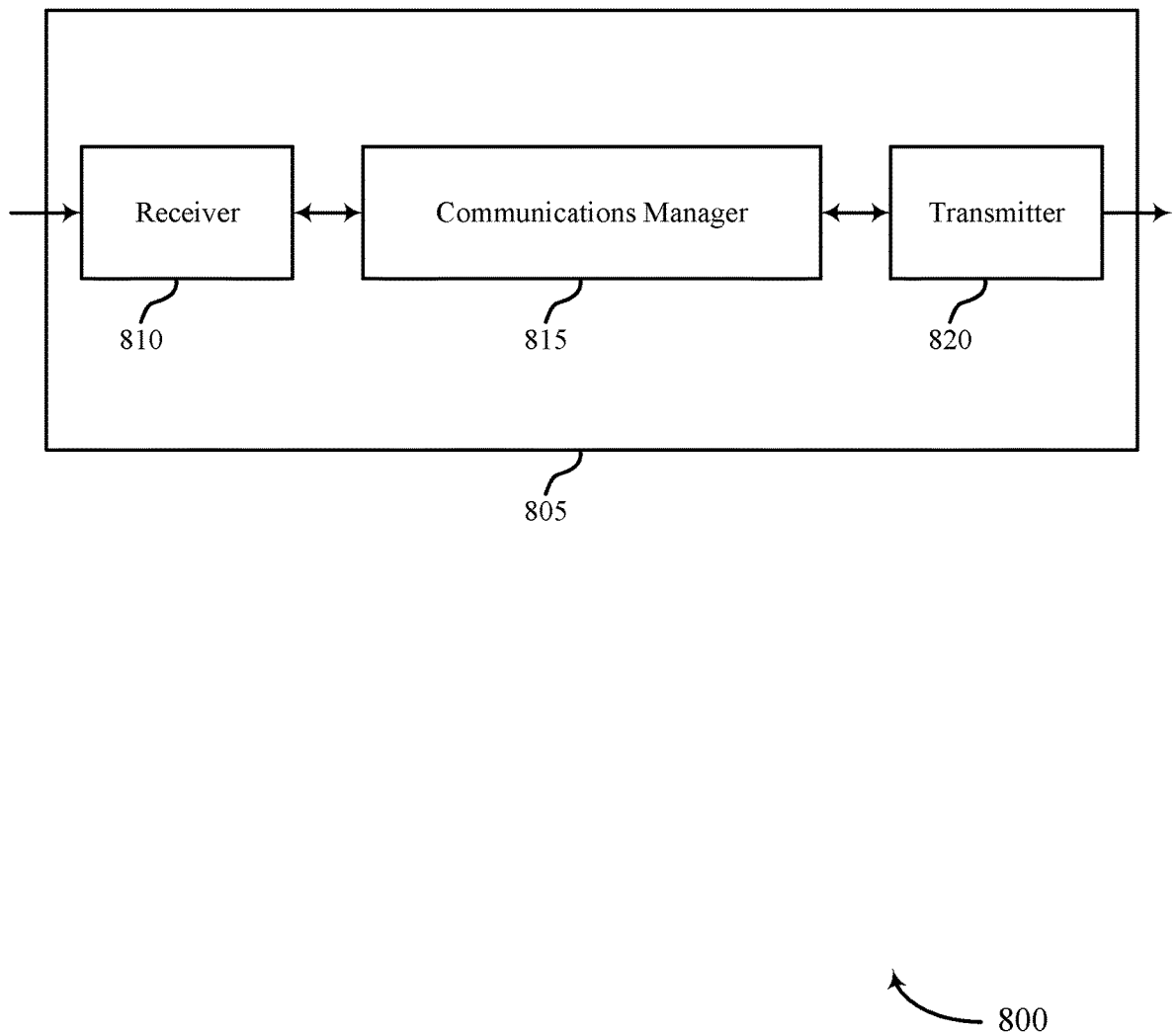
FIGS. 8 and 9 show block diagrams of devices that support QCL relationship reporting in accordance with aspects of the present disclosure.

FIG. 8 shows a block diagram 800 of a device 805 that supports QCL relationship reporting in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to QCL relationship reporting, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit to a UE according to a first receive configuration based on a first QCL relationship, receive, from the UE, an indication of a second QCL relationship, receive an uplink signal according to a second receive configuration based on the received indication of the second QCL relationship, and decode the received uplink signal based on the second QCL relationship. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

By including or configuring the communications manager 815 in accordance with examples as described herein, the device 805 (e.g., a processor controlling or otherwise coupled to the receiver 810, the communications manager 815, the transmitter 820, or a combination thereof) may support techniques for reduced processing, reduced power consumption, and more efficient utilization of communication resources.

Figure 9:
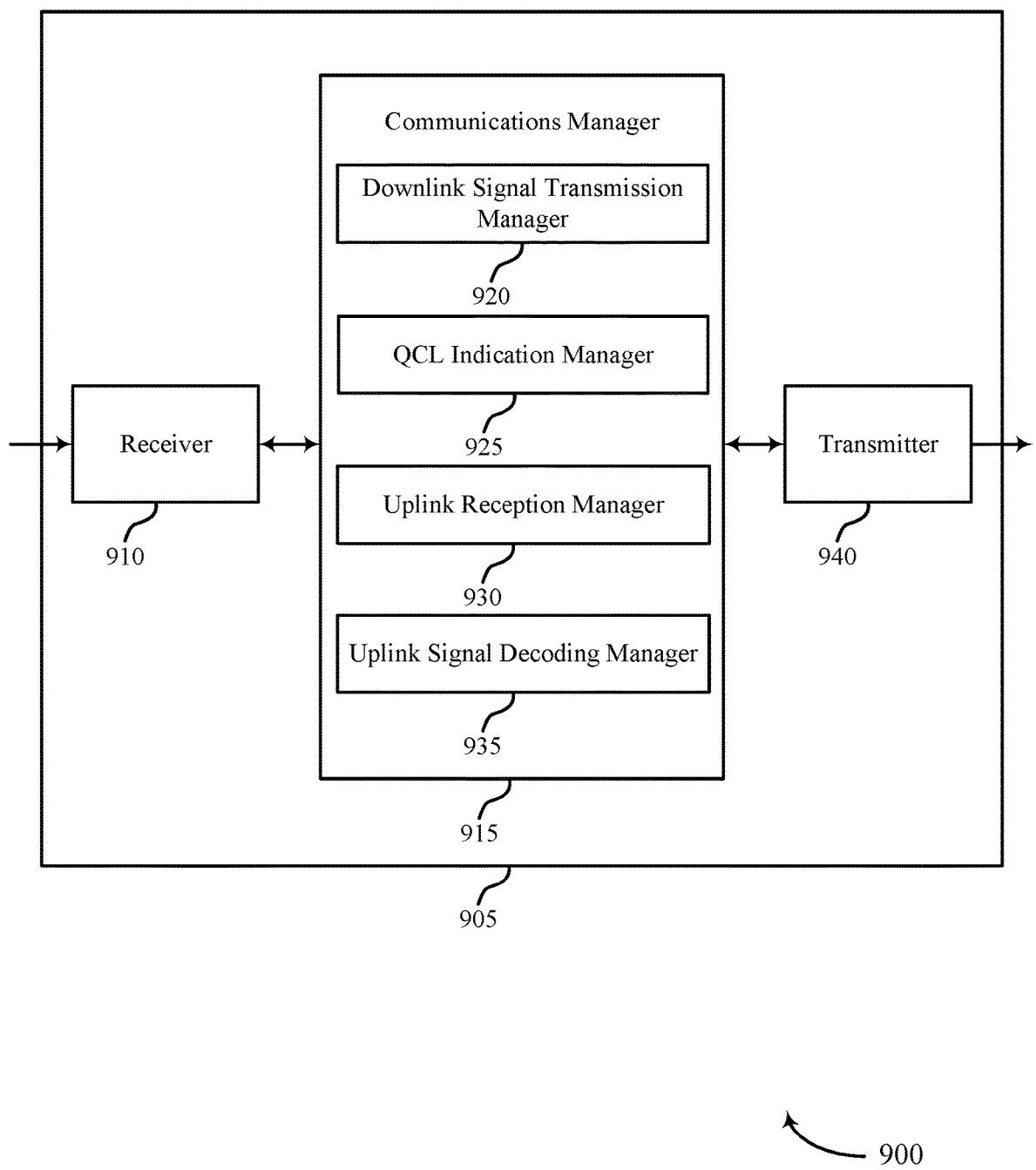

FIG. 9 shows a block diagram 900 of a device 905 that supports QCL relationship reporting in accordance with aspects of the present disclosure. The device 905 may be an example of aspects of a device 805, or a base station 105 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to QCL relationship reporting, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a downlink signal transmission manager 920, a QCL indication manager 925, an uplink reception manager 930, and an uplink signal decoding manager 935. The communications manager 915 may be an example of aspects of the communications manager 1110 described herein.

The downlink signal transmission manager 920 may transmit to a UE according to a first receive configuration based on a first QCL relationship. The QCL indication manager 925 may receive, from the UE, an indication of a second QCL relationship. The uplink reception manager 930 may receive an uplink signal according to a second receive configuration based on the received indication of the second QCL relationship. The uplink signal decoding manager 935 may decode the received uplink signal based on the second QCL relationship.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
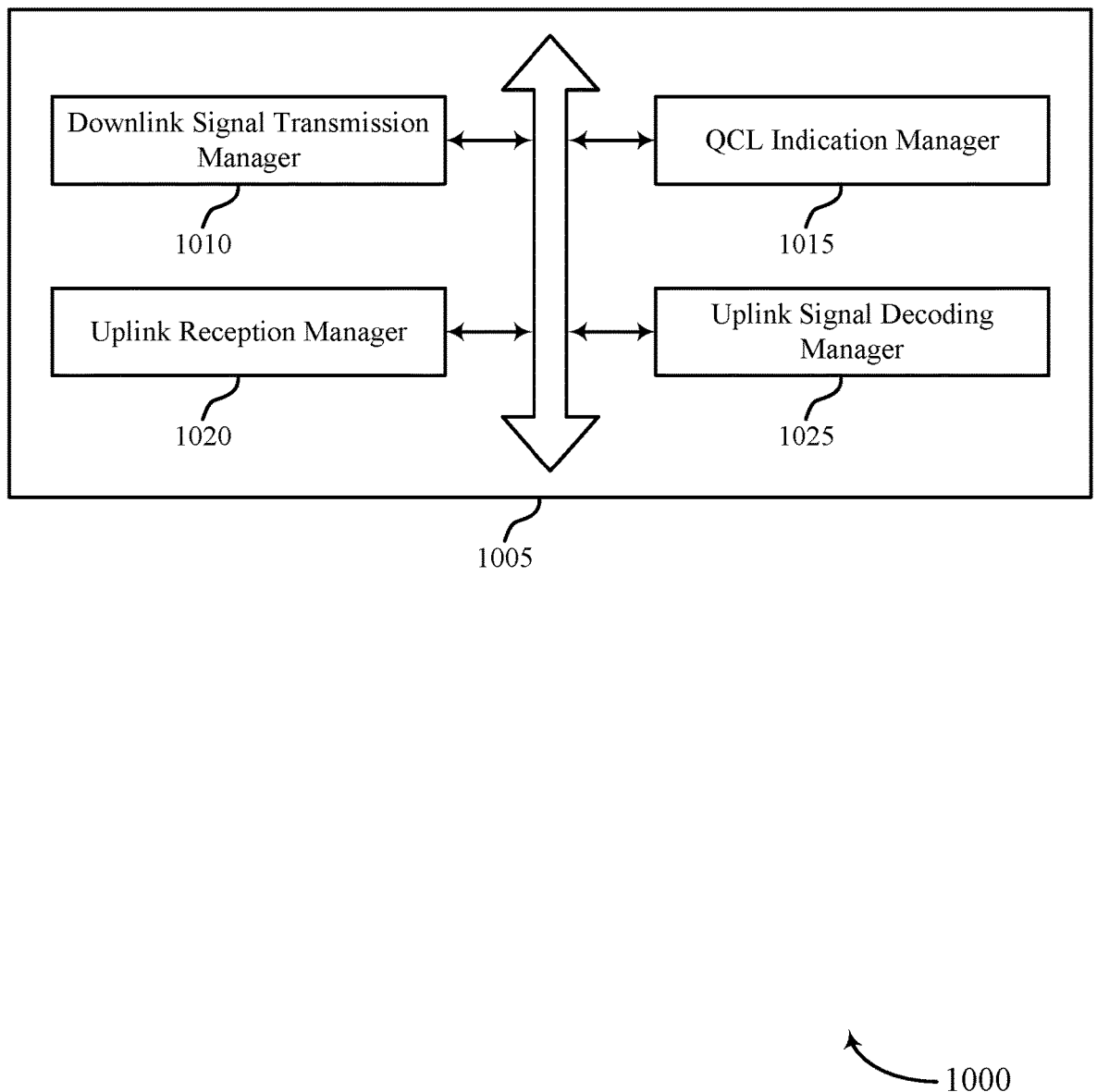
FIG. 10 shows a block diagram of a communications manager that supports QCL relationship reporting in accordance with aspects of the present disclosure.

FIG. 10 shows a block diagram 1000 of a communications manager 1005 that supports QCL relationship reporting in accordance with aspects of the present disclosure. The communications manager 1005 may be an example of aspects of a communications manager 815, a communications manager 915, or a communications manager 1110 described herein. The communications manager 1005 may include a downlink signal transmission manager 1010, a QCL indication manager 1015, an uplink reception manager 1020, and an uplink signal decoding manager 1025. Each of these modules may communicate, directly or indirectly, with one another (e.g., via one or more buses).

The downlink signal transmission manager 1010 may transmit to a UE according to a first receive configuration based on a first QCL relationship. The QCL indication manager 1015 may receive, from the UE, an indication of a second QCL relationship. In some examples, the uplink reception manager 1020 may receive an uplink signal according to a second receive configuration based on the received indication of the second QCL relationship. The uplink signal decoding manager 1025 may decode the received uplink signal based on the second QCL relationship.

In some cases, the first QCL relationship is a QCL-Type A, QCL-Type B, QCL-Type C, or QCL-Type D. In some cases, the second QCL relationship is a QCL-Type A, QCL-Type B, QCL-Type C, or QCL-Type D. In some cases, the first QCL relationship is different than the second QCL relationship. In some cases, the first QCL relationship and the second QCL relationship are a same QCL type, the QCL type including one of a QCL-Type A, QCL-Type B, QCL-Type C, or QCL-Type D, and a first set of beams associated with the first QCL relationship is different than a second set of beams associated with the second QCL relationship.

In some examples, the QCL indication manager 1015 may receive an SRS associated with the second QCL relationship, a DMRS associated with the second QCL relationship, or any combination thereof. In some cases, the uplink signal is a PUSCH transmission.

The downlink signal transmission manager 1010 may transmit, to the UE, a first downlink signal. In some examples, the downlink signal transmission manager 1010 may transmit, to the UE, a second downlink signal based on the second QCL relationship between the first downlink signal and the second downlink signal. In some cases, the first downlink signal is an SSB and the second downlink signal is a PDCCH transmission, the first downlink signal is a channel state information reference signal and the second downlink signal is a PDSCH transmission, or any combination thereof.

Figure 11:
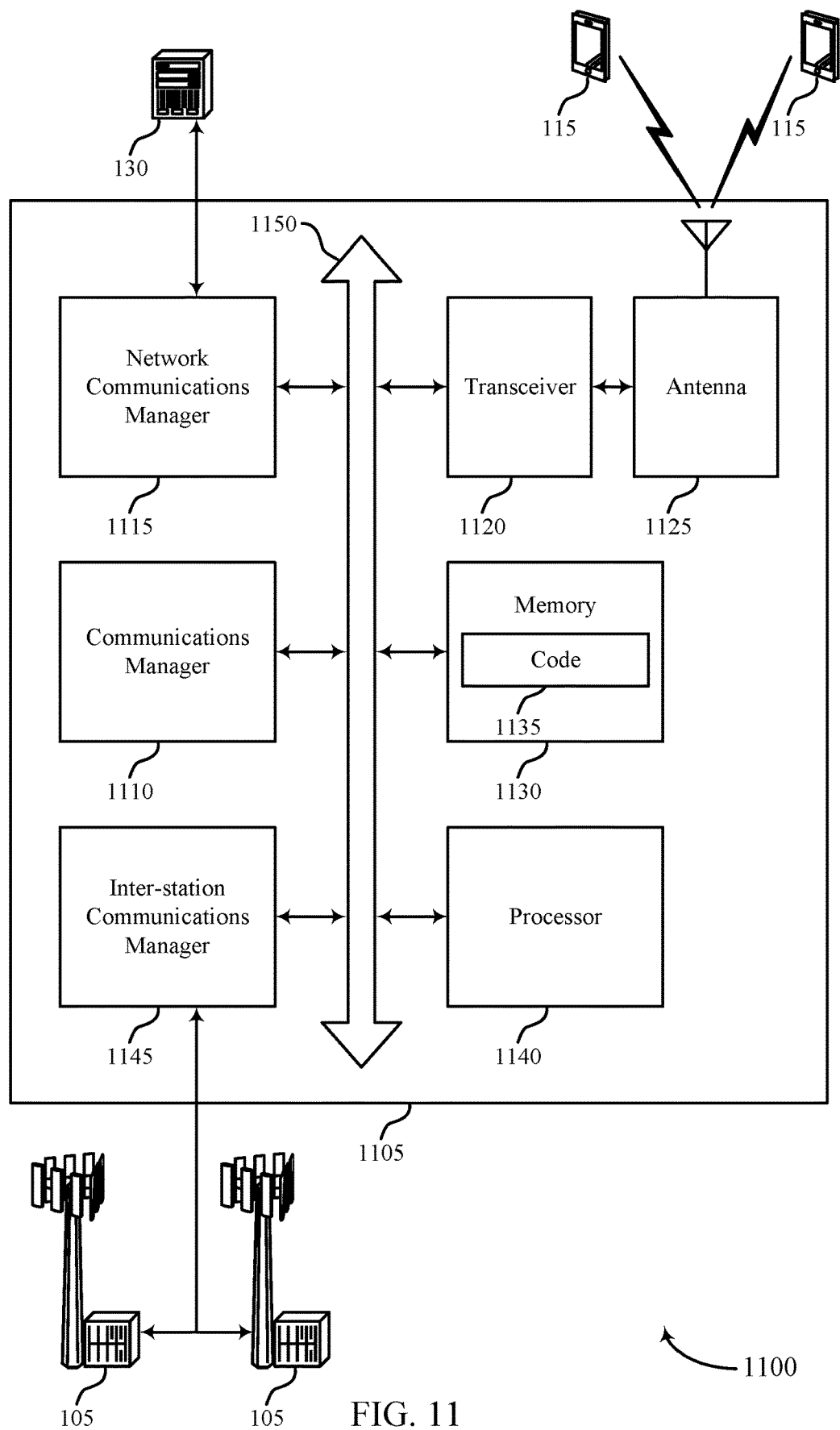
FIG. 11 shows a diagram of a system including a device that supports QCL relationship reporting in accordance with aspects of the present disclosure.

FIG. 11 shows a diagram of a system 1100 including a device 1105 that supports QCL relationship reporting in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit to a UE according to a first receive configuration based on a first QCL relationship, receive, from the UE, an indication of a second QCL relationship, receive an uplink signal according to a second receive configuration based on the received indication of the second QCL relationship and decode the received uplink signal based on the second QCL relationship.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting QCL relationship reporting).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

By including or configuring the communications manager 1110 in accordance with examples as described herein, the device 1105 may support techniques for improved communication reliability, reduced latency, improved user experience related to reduced processing, reduced power consumption, more efficient utilization of communication resources, improved coordination between devices, longer battery life, and improved utilization of processing capability.

Figure 12:
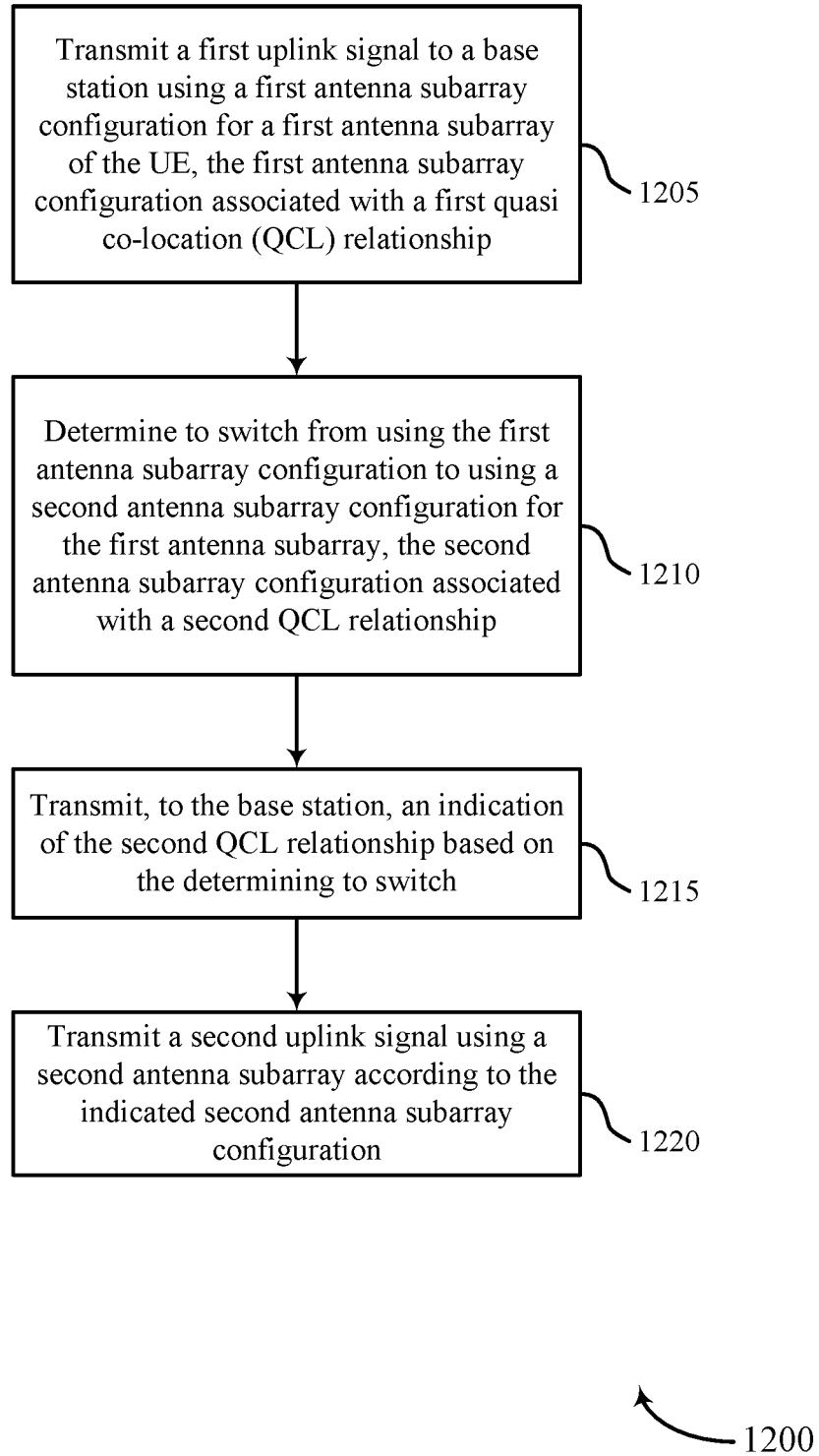
FIGS. 12 through 15 show flowcharts illustrating methods that support QCL relationship reporting in accordance with aspects of the present disclosure.

FIG. 12 shows a flowchart illustrating a method 1200 that supports QCL relationship reporting in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may transmit a first uplink signal to a base station using a first antenna subarray configuration for a first antenna subarray of the UE, the first antenna subarray configuration associated with a first QCL relationship. The operations of 1205 may be performed according to the methods described herein. In some examples, aspects of the operations of 1205 may be performed by an uplink transmission module as described with reference to FIGS. 4 through 7.

At 1210, the UE may determine to switch from using the first antenna subarray configuration to using a second antenna subarray configuration for the first antenna subarray, the second antenna subarray configuration associated with a second QCL relationship. The operations of 1210 may be performed according to the methods described herein. In some examples, aspects of the operations of 1210 may be performed by a subarray switching module as described with reference to FIGS. 4 through 7.

At 1215, the UE may transmit, to the base station, an indication of the second QCL relationship based on the determining to switch. The operations of 1215 may be performed according to the methods described herein. In some examples, aspects of the operations of 1215 may be performed by a QCL indication module as described with reference to FIGS. 4 through 7.

At 1220, the UE may transmit a second uplink signal using a second antenna subarray according to the indicated second antenna subarray configuration. The operations of 1220 may be performed according to the methods described herein. In some examples, aspects of the operations of 1220 may be performed by an uplink transmission module as described with reference to FIGS. 4 through 7.

Figure 13:
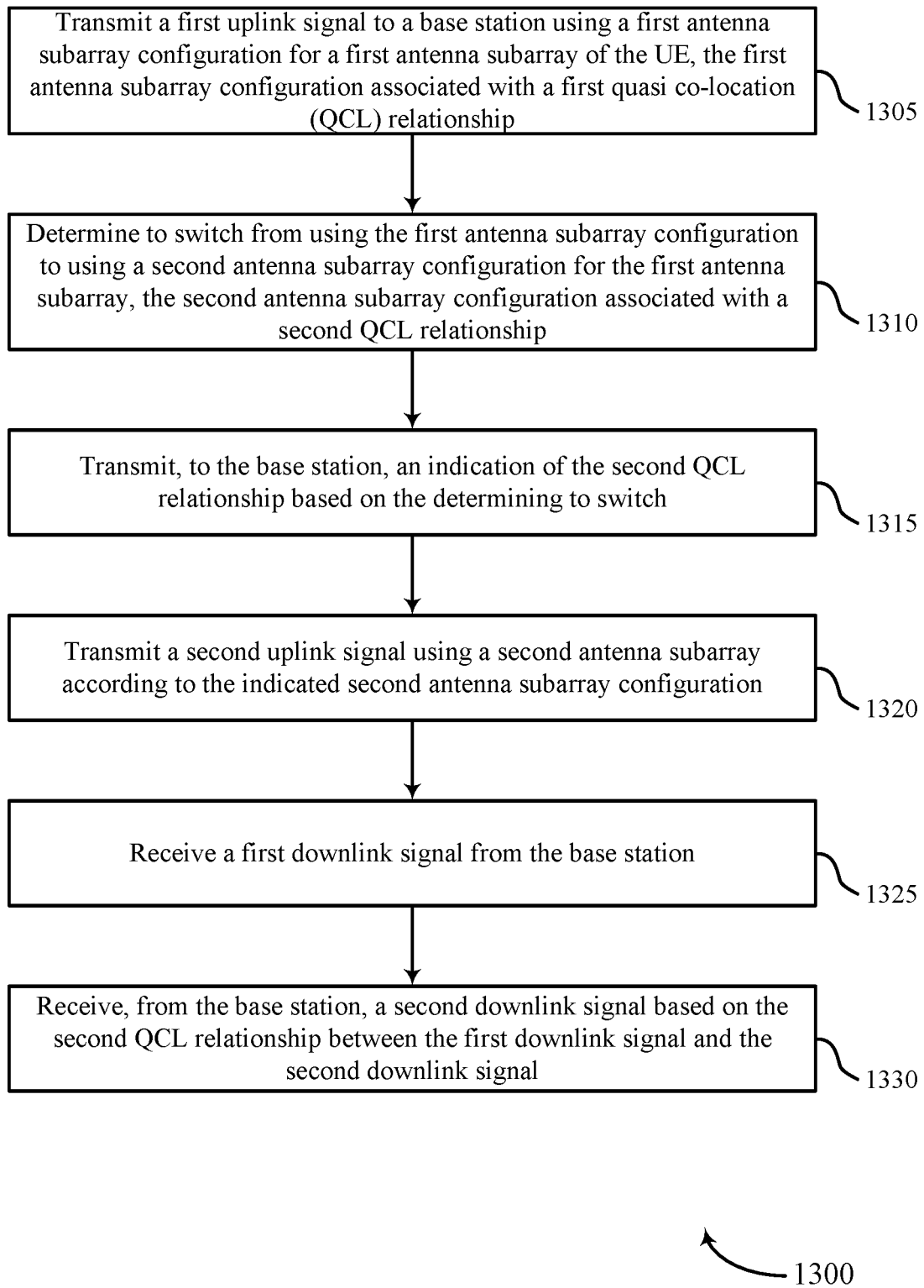

FIG. 13 shows a flowchart illustrating a method 1300 that supports QCL relationship reporting in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may transmit a first uplink signal to a base station using a first antenna subarray configuration for a first antenna subarray of the UE, the first antenna subarray configuration associated with a first QCL relationship. The operations of 1305 may be performed according to the methods described herein. In some examples, aspects of the operations of 1305 may be performed by an uplink transmission module as described with reference to FIGS. 4 through 7.

At 1310, the UE may determine to switch from using the first antenna subarray configuration to using a second antenna subarray configuration for the first antenna subarray, the second antenna subarray configuration associated with a second QCL relationship. The operations of 1310 may be performed according to the methods described herein. In some examples, aspects of the operations of 1310 may be performed by a subarray switching module as described with reference to FIGS. 4 through 7.

At 1315, the UE may transmit, to the base station, an indication of the second QCL relationship based on the determining to switch. The operations of 1315 may be performed according to the methods described herein. In some examples, aspects of the operations of 1315 may be performed by a QCL indication module as described with reference to FIGS. 4 through 7.

At 1320, the UE may transmit a second uplink signal using a second antenna subarray according to the indicated second antenna subarray configuration. The operations of 1320 may be performed according to the methods described herein. In some examples, aspects of the operations of 1320 may be performed by an uplink transmission module as described with reference to FIGS. 4 through 7.

At 1325, the UE may receive a first downlink signal from the base station. The operations of 1325 may be performed according to the methods described herein. In some examples, aspects of the operations of 1325 may be performed by a downlink signal reception module as described with reference to FIGS. 4 through 7.

At 1330, the UE may receive, from the base station, a second downlink signal based on the second QCL relationship between the first downlink signal and the second downlink signal. The operations of 1330 may be performed according to the methods described herein. In some examples, aspects of the operations of 1330 may be performed by a downlink signal reception module as described with reference to FIGS. 4 through 7.

Figure 14:
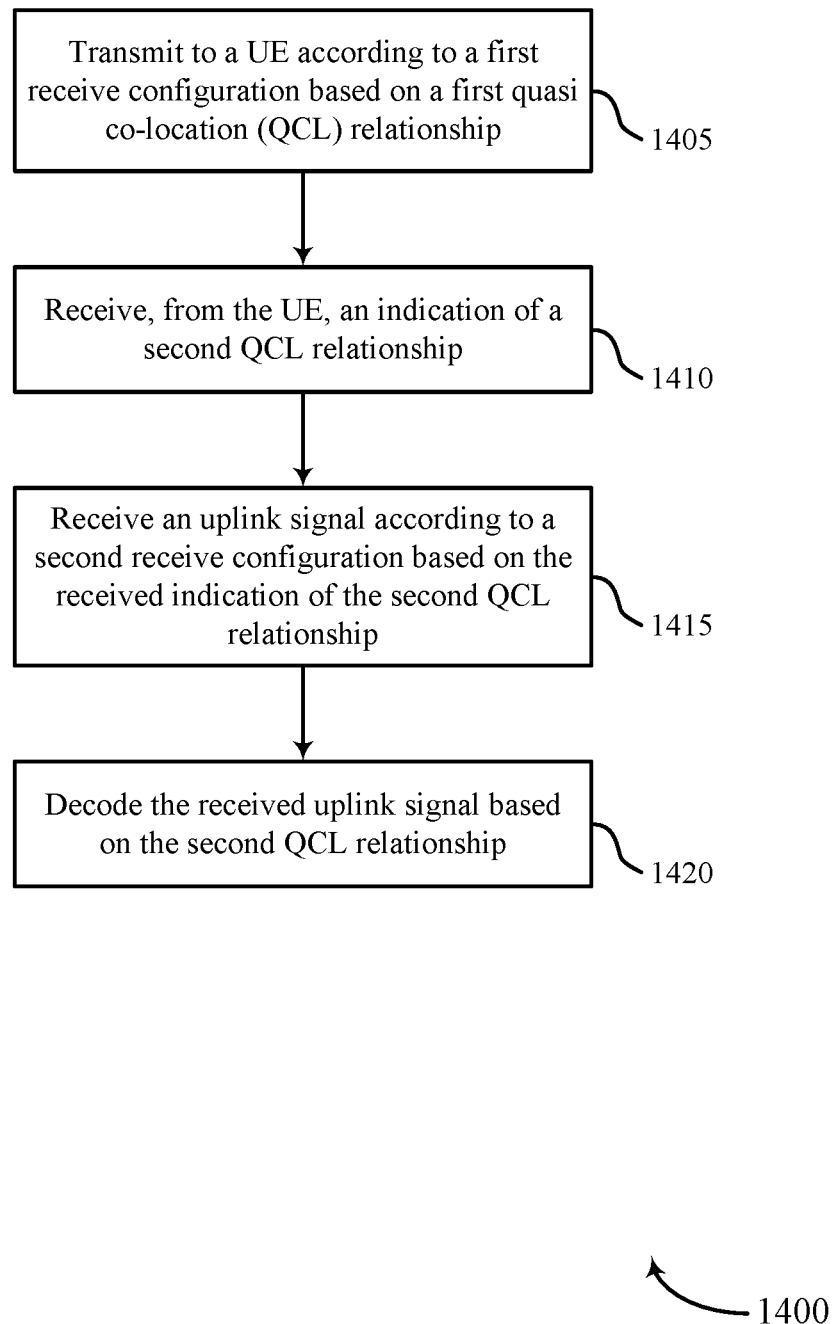

FIG. 14 shows a flowchart illustrating a method 1400 that supports QCL relationship reporting in accordance with aspects of the present disclosure. The operations of method 1400 may be implemented by a base station 105 or its components as described herein. For example, the operations of method 1400 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1405, the base station may transmit to a UE according to a first receive configuration based on a first QCL relationship. The operations of 1405 may be performed according to the methods described herein. In some examples, aspects of the operations of 1405 may be performed by a downlink signal transmission manager as described with reference to FIGS. 8 through 11.

At 1410, the base station may receive, from the UE, an indication of a second QCL relationship. The operations of 1410 may be performed according to the methods described herein. In some examples, aspects of the operations of 1410 may be performed by a QCL indication manager as described with reference to FIGS. 8 through 11.

At 1415, the base station may receive an uplink signal according to a second receive configuration based on the received indication of the second QCL relationship. The operations of 1415 may be performed according to the methods described herein. In some examples, aspects of the operations of 1415 may be performed by an uplink reception manager as described with reference to FIGS. 8 through 11.

At 1420, the base station may decode the received uplink signal based on the second QCL relationship. The operations of 1420 may be performed according to the methods described herein. In some examples, aspects of the operations of 1420 may be performed by an uplink signal decoding manager as described with reference to FIGS. 8 through 11.

Figure 15:
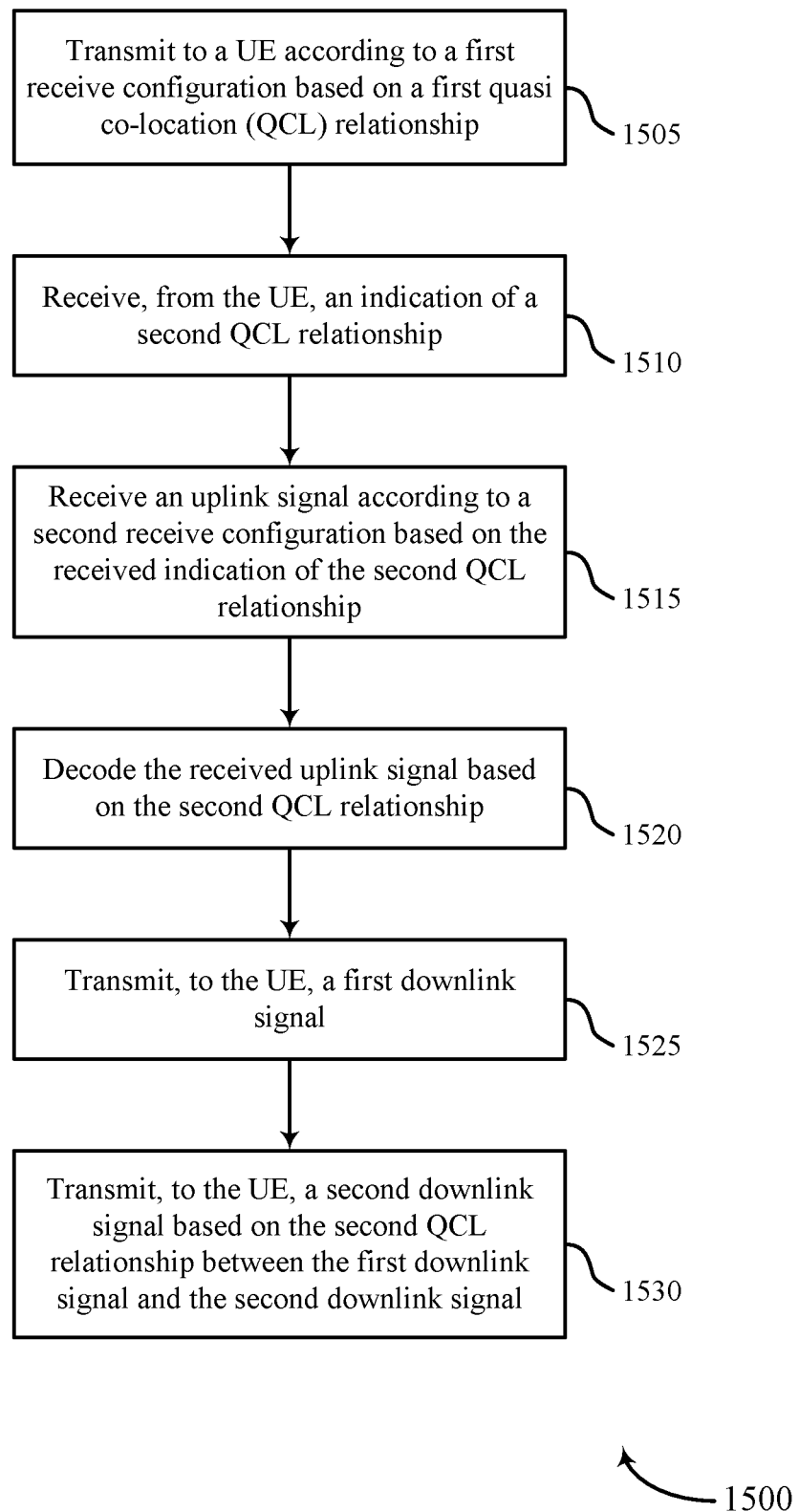

FIG. 15 shows a flowchart illustrating a method 1500 that supports QCL relationship reporting in accordance with aspects of the present disclosure. The operations of method 1500 may be implemented by a base station 105 or its components as described herein. For example, the operations of method 1500 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1505, the base station may transmit to a UE according to a first receive configuration based on a first QCL relationship. The operations of 1505 may be performed according to the methods described herein. In some examples, aspects of the operations of 1505 may be performed by a downlink signal transmission manager as described with reference to FIGS. 8 through 11.

At 1510, the base station may receive, from the UE, an indication of a second QCL relationship. The operations of 1510 may be performed according to the methods described herein. In some examples, aspects of the operations of 1510 may be performed by a QCL indication manager as described with reference to FIGS. 8 through 11.

At 1515, the base station may receive an uplink signal according to a second receive configuration based on the received indication of the second QCL relationship. The operations of 1515 may be performed according to the methods described herein. In some examples, aspects of the operations of 1515 may be performed by an uplink reception manager as described with reference to FIGS. 8 through 11.

At 1520, the base station may decode the received uplink signal based on the second QCL relationship. The operations of 1520 may be performed according to the methods described herein. In some examples, aspects of the operations of 1520 may be performed by an uplink signal decoding manager as described with reference to FIGS. 8 through 11.

At 1525, the base station may transmit, to the UE, a first downlink signal. The operations of 1525 may be performed according to the methods described herein. In some examples, aspects of the operations of 1525 may be performed by a downlink signal transmission manager as described with reference to FIGS. 8 through 11.

At 1530, the base station may transmit, to the UE, a second downlink signal based on the second QCL relationship between the first downlink signal and the second downlink signal. The operations of 1530 may be performed according to the methods described herein. In some examples, aspects of the operations of 1530 may be performed by a downlink signal transmission manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: transmitting a first uplink signal to a base station using a first antenna subarray configuration for a first antenna subarray of the UE, the first antenna subarray configuration associated with a first quasi co-location (QCL) relationship; determining to switch from using the first antenna subarray configuration to using a second antenna subarray configuration for the first antenna subarray, the second antenna subarray configuration associated with a second QCL relationship; transmitting, to the base station, an indication of the second QCL relationship based at least in part on the determining to switch; and transmitting a second uplink signal using a second antenna subarray according to the indicated second antenna subarray configuration.

Aspect 2: The method of aspect 1, wherein the first antenna subarray comprises a first subset of antenna elements of an antenna array, and the second antenna subarray comprises a second subset of antenna elements of the antenna array.

Aspect 3: The method of aspect 2, wherein at least a first portion of the first subset of antenna elements are different than the second subset of antenna elements, and at least a second portion of the second subset of antenna elements are different than the first subset of antenna elements.

Aspect 4: The method of any of aspects 2 through 3, wherein the first antenna subarray of the antenna array, the second antenna subarray of the antenna array, or both, are configured for communications in a frequency range including at least from 24.25 GHz to 114.25 GHz.

Aspect 5: The method of any of aspects 1 through 4, wherein the first QCL relationship is a QCL-Type A, QCL-Type B, QCL-Type C, or QCL-Type D; the second QCL relationship is a QCL-Type A, QCL-Type B, QCL-Type C, or QCL-Type D; and the first QCL relationship is different than the second QCL relationship.

Aspect 6: The method of any of aspects 1 through 5, wherein the first QCL relationship and the second QCL relationship are a same QCL type, the QCL type comprising one of a QCL-Type A, QCL-Type B, QCL-Type C, or QCL-Type D, and a first set of beams associated with the first QCL relationship is different than a second set of beams associated with the second QCL relationship.

Aspect 7: The method of any of aspects 1 through 6, wherein transmitting the indication further comprises: transmitting, to indicate the second QCL relationship, an SRS that is associated with the second QCL relationship, or a DMRS that is associated with the second QCL relationship, or both.

Aspect 8: The method of any of aspects 1 through 7, wherein the second uplink signal is a physical uplink shared channel transmission.

Aspect 9: The method of any of aspects 1 through 8, further comprising: receiving a first downlink signal from the base station; and receiving, from the base station, a second downlink signal based at least in part on the second QCL relationship between the first downlink signal and the second downlink signal.

Aspect 10: The method of aspect 9, wherein the first downlink signal is a synchronization signal block and the second downlink signal is a physical downlink control channel transmission, the first downlink signal is a channel state information reference signal and the second downlink signal is a physical downlink shared channel transmission, or any combination thereof.

Aspect 11: The method of any of aspects 1 through 10, wherein determining to switch from the first antenna subarray configuration to the second antenna subarray configuration is based at least in part on a change in a beamformed or non-beamformed delay spread, or a beam coherence time, or a Doppler spread, or an effective Doppler spread, or a combination thereof.

Aspect 12: The method of aspect 11, further comprising: determining the beamformed delay spread using a first beam having a different beamwidth than a second beam used by the UE to transmit the second uplink signal, wherein determining to switch from the first antenna subarray configuration to the second antenna subarray configuration is based at least in part on the determined beamformed delay spread.

Aspect 13: The method of any of aspects 11 through 12, wherein the beam coherence time corresponds to a relevancy time for a beam in terms of a received signal strength correlation used by the UE to transmit the second uplink signal.

Aspect 14: A method for wireless communications at a base station, comprising: transmitting to a UE according to a first receive configuration based at least in part on a first quasi co-location (QCL) relationship; receiving, from the UE, an indication of a second QCL relationship; receiving an uplink signal according to a second receive configuration based at least in part on the received indication of the second QCL relationship; and decoding the received uplink signal based at least in part on the second QCL relationship.

Aspect 15: The method of aspect 14, wherein the first QCL relationship is a QCL-Type A, QCL-Type B, QCL-Type C, or QCL-Type D; the second QCL relationship is a QCL-Type A, QCL-Type B, QCL-Type C, or QCL-Type D; and the first QCL relationship is different than the second QCL relationship.

Aspect 16: The method of any of aspects 14 through 15, wherein the first QCL relationship and the second QCL relationship are a same QCL type, the QCL type comprising one of a QCL-Type A, QCL-Type B, QCL-Type C, or QCL-Type D, and a first set of beams associated with the first QCL relationship is different than a second set of beams associated with the second QCL relationship.

Aspect 17: The method of any of aspects 14 through 16, wherein receiving the indication comprises: receiving a sounding reference signal associated with the second QCL relationship, a demodulation reference signal associated with the second QCL relationship, or any combination thereof.

Aspect 18: The method of any of aspects 14 through 17, wherein the uplink signal is a physical uplink shared channel transmission.

Aspect 19: The method of any of aspects 14 through 18, further comprising: transmitting, to the UE, a first downlink signal; and transmitting, to the UE, a second downlink signal based at least in part on the second QCL relationship between the first downlink signal and the second downlink signal.

Aspect 20: The method of aspect 19, wherein the first downlink signal is a synchronization signal block and the second downlink signal is a physical downlink control channel transmission, the first downlink signal is a channel state information reference signal and the second downlink signal is a physical downlink shared channel transmission, or any combination thereof.

Aspect 21: An apparatus for wireless communications at a UE, comprising a processor; memory coupled with the processor; and instructions stored in the memory and executable by the processor to cause the apparatus to perform a method of any of aspects 1 through 13.

Aspect 22: An apparatus for wireless communications at a UE, comprising at least one means for performing a method of any of aspects 1 through 13.

Aspect 23: A non-transitory computer-readable medium storing code for wireless communications at a UE, the code comprising instructions executable by a processor to perform a method of any of aspects 1 through 13.

Aspect 24: An apparatus for wireless communications at a base station, comprising a processor; memory coupled with the processor; and instructions stored in the memory and executable by the processor to cause the apparatus to perform a method of any of aspects 14 through 20.

Aspect 25: An apparatus for wireless communications at a base station, comprising at least one means for performing a method of any of aspects 14 through 20.

Aspect 26: A non-transitory computer-readable medium storing code for wireless communications at a base station, the code comprising instructions executable by a processor to perform a method of any of aspects 14 through 20.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   transmitting a first uplink signal to a base station using a first antenna subarray configuration for a first antenna subarray of the UE, the first antenna subarray configuration associated with a first quasi co-location (QCL) relationship;
   determining to switch from using the first antenna subarray configuration to using a second antenna subarray configuration for the first antenna subarray, the second antenna subarray configuration associated with a second QCL relationship;
   transmitting, to the base station, an indication of the second QCL relationship based at least in part on the determining to switch; and
   transmitting a second uplink signal using a second antenna subarray according to the indicated second antenna subarray configuration.

2. The method of claim 1, wherein the first antenna subarray comprises a first subset of antenna elements of an antenna array, and the second antenna subarray comprises a second subset of antenna elements of the antenna array.

3. The method of claim 2, wherein at least a first portion of the first subset of antenna elements are different than the second subset of antenna elements, and at least a second portion of the second subset of antenna elements are different than the first subset of antenna elements.

4. The method of claim 2, wherein the first antenna subarray of the antenna array, the second antenna subarray of the antenna array, or both, are configured for communications in a frequency range including at least from 24.25 GHz to 114.25 GHz.

5. The method of claim 1, wherein:
   the first QCL relationship is a QCL-Type A, QCL-Type B, QCL-Type C, or QCL-Type D;
   the second QCL relationship is a QCL-Type A, QCL-Type B, QCL-Type C, or QCL-Type D; and
   the first QCL relationship is different than the second QCL relationship.

6. The method of claim 1, wherein the first QCL relationship and the second QCL relationship are a same QCL type, the QCL type comprising one of a QCL-Type A, QCL-Type B, QCL-Type C, or QCL-Type D, and a first set of beams associated with the first QCL relationship is different than a second set of beams associated with the second QCL relationship.

7. The method of claim 1, wherein transmitting the indication further comprises:
   transmitting, to indicate the second QCL relationship, a sounding reference signal (SRS) that is associated with the second QCL relationship, or a demodulation reference signal (DMRS) that is associated with the second QCL relationship, or both.

8. The method of claim 1, wherein the second uplink signal is a physical uplink shared channel transmission.

9. The method of claim 1, further comprising:
   receiving a first downlink signal from the base station; and
   receiving, from the base station, a second downlink signal based at least in part on the second QCL relationship between the first downlink signal and the second downlink signal.

10. The method of claim 9, wherein the first downlink signal is a synchronization signal block and the second downlink signal is a physical downlink control channel transmission, the first downlink signal is a channel state information reference signal and the second downlink signal is a physical downlink shared channel transmission, or any combination thereof.

11. The method of claim 1, wherein:
    determining to switch from the first antenna subarray configuration to the second antenna subarray configuration is based at least in part on a change in a beamformed or non-beamformed delay spread, or a beam coherence time, or a Doppler spread, or an effective Doppler spread, or a combination thereof.

12. The method of claim 11, further comprising:
    determining the beamformed delay spread using a first beam having a different beamwidth than a second beam used by the UE to transmit the second uplink signal, wherein determining to switch from the first antenna subarray configuration to the second antenna subarray configuration is based at least in part on the determined beamformed delay spread.

13. The method of claim 11, wherein the beam coherence time corresponds to a relevancy time for a beam in terms of a received signal strength correlation used by the UE to transmit the second uplink signal.

14. A method for wireless communications at a base station, comprising:
    transmitting to a user equipment (UE) according to a first receive configuration based at least in part on a first quasi co-location (QCL) relationship;
    receiving, from the UE, an indication of a second QCL relationship;
    receiving an uplink signal according to a second receive configuration based at least in part on the received indication of the second QCL relationship; and
    decoding the received uplink signal based at least in part on the second QCL relationship.

15. The method of claim 14, wherein:
    the first QCL relationship is a QCL-Type A, QCL-Type B, QCL-Type C, or QCL-Type D;
    the second QCL relationship is a QCL-Type A, QCL-Type B, QCL-Type C, or QCL-Type D; and
    the first QCL relationship is different than the second QCL relationship.

16. The method of claim 14, wherein the first QCL relationship and the second QCL relationship are a same QCL type, the QCL type comprising one of a QCL-Type A, QCL-Type B, QCL-Type C, or QCL-Type D, and a first set of beams associated with the first QCL relationship is different than a second set of beams associated with the second QCL relationship.

17. The method of claim 14, wherein receiving the indication comprises:
receiving a sounding reference signal associated with the second QCL relationship, a demodulation reference signal associated with the second QCL relationship, or any combination thereof.

18. The method of claim 14, wherein the uplink signal is a physical uplink shared channel transmission.

19. The method of claim 14, further comprising:
transmitting, to the UE, a first downlink signal; and
transmitting, to the UE, a second downlink signal based at least in part on the second QCL relationship between the first downlink signal and the second downlink signal.

20. The method of claim 19, wherein the first downlink signal is a synchronization signal block and the second downlink signal is a physical downlink control channel transmission, the first downlink signal is a channel state information reference signal and the second downlink signal is a physical downlink shared channel transmission, or any combination thereof.

21. An apparatus for wireless communications at a user equipment (UE), comprising:
a processor,
memory coupled with the processor; and
instructions stored in the memory and executable by the processor to cause the apparatus to:
transmit a first uplink signal to a base station using a first antenna subarray configuration for a first antenna subarray of the UE, the first antenna subarray configuration associated with a first quasi co-location (QCL) relationship;
determine to switch from using the first antenna subarray configuration to using a second antenna subarray configuration for the first antenna subarray, the second antenna subarray configuration associated with a second QCL relationship;
transmit, to the base station, an indication of the second QCL relationship based at least in part on the determining to switch; and
transmit a second uplink signal using a second antenna subarray according to the indicated second antenna subarray configuration.

22. The apparatus of claim 21, wherein the first antenna subarray comprises a first subset of antenna elements of an antenna array, and the second antenna subarray comprises a second subset of antenna elements of the antenna array.

23. The apparatus of claim 22, wherein at least a first portion of the first subset of antenna elements are different than the second subset of antenna elements, and at least a second portion of the second subset of antenna elements are different than the first subset of antenna elements.

24. The apparatus of claim 22, wherein the first antenna subarray of the antenna array, the second antenna subarray of the antenna array, or both, are configured for communications in a frequency range including at least from 24.25 GHz to 114.25 GHz.

25. The apparatus of claim 21, wherein:
the first QCL relationship is a QCL-Type A, QCL-Type B, QCL-Type C, or QCL-Type D;
the second QCL relationship is a QCL-Type A, QCL-Type B, QCL-Type C, or QCL-Type D; and
the first QCL relationship is different than the second QCL relationship.

26. The apparatus of claim 21, wherein the first QCL relationship and the second QCL relationship are a same QCL type, the QCL type comprising one of a QCL-Type A, QCL-Type B, QCL-Type C, or QCL-Type D, and a first set of beams associated with the first QCL relationship is different than a second set of beams associated with the second QCL relationship.

27. The apparatus of claim 21, wherein the instructions to transmit the indication are further executable by the processor to cause the apparatus to:
transmit, to indicate the second QCL relationship, a sounding reference signal (SRS) that is associated with the second QCL relationship, or a demodulation reference signal (DMRS) that is associated with the second QCL relationship, or both.

28. The apparatus of claim 21, wherein the second uplink signal is a physical uplink shared channel transmission.

29. The apparatus of claim 21, wherein the instructions are further executable by the processor to cause the apparatus to:
receive a first downlink signal from the base station; and
receive, from the base station, a second downlink signal based at least in part on the second QCL relationship between the first downlink signal and the second downlink signal.

30. An apparatus for wireless communications at a base station, comprising:
a processor,
memory coupled with the processor; and
instructions stored in the memory and executable by the processor to cause the apparatus to:
transmit to a user equipment (UE) according to a first receive configuration based at least in part on a first quasi co-location (QCL) relationship;
receive, from the UE, an indication of a second QCL relationship;
receive an uplink signal according to a second receive configuration based at least in part on the received indication of the second QCL relationship; and
decode the received uplink signal based at least in part on the second QCL relationship.

\* \* \* \* \*